US011483877B2

(12) United States Patent
Ravishankar et al.

(10) Patent No.: US 11,483,877 B2
(45) Date of Patent: Oct. 25, 2022

(54) APPROACHES FOR HIGH SPEED GLOBAL PACKET DATA SERVICES FOR LEO/MEO SATELLITE SYSTEMS

(71) Applicant: Hughes Network Systems, LLC, Germantown, MD (US)

(72) Inventors: Channasandra Ravishankar, Clarksburg, MD (US); John Corrigan, Chevy Chase, MD (US); Rajeev Gopal, North Potomac, MD (US); Nassir Benammar, Rockville, MD (US); Gaguk Zakaria, College Park, MD (US); Deepak Arur, Vienna, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/186,907

(22) Filed: Nov. 12, 2018

(65) Prior Publication Data

US 2019/0082481 A1 Mar. 14, 2019

Related U.S. Application Data

(63) Continuation-in-part of application No. 15/186,417, filed on Jun. 17, 2016, now Pat. No. 10,177,837.
(Continued)

(51) Int. Cl.
*H04W 76/10* (2018.01)
*H04B 7/195* (2006.01)
(Continued)

(52) U.S. Cl.
CPC .......... *H04W 76/10* (2018.02); *H04B 7/1851* (2013.01); *H04B 7/195* (2013.01); *H04W 88/16* (2013.01)

(58) Field of Classification Search
CPC ..... H04W 60/00; H04W 68/00; H04W 76/10; H04W 76/12; H04W 76/27; H04W 88/16;
(Continued)

(56) References Cited

U.S. PATENT DOCUMENTS 6,272,325 B1 * 8/2001 Wiedeman ......... H04B 7/18543
340/600
6,442,147 B1 8/2002 Mauger et al.
(Continued)

OTHER PUBLICATIONS

USPTO, "International Search Report & Written Opinion", PCT/US2016/038260, dated Sep. 28, 2016.

*Primary Examiner* — Ayaz R Sheikh
*Assistant Examiner* — Debebe A Asefa
(74) *Attorney, Agent, or Firm* — Potomac Technology Law, LLC

(57) ABSTRACT

A user terminal (UT) for a mobile satellite communications system, and an associated method for managing tracking areas for such a UT is provided. When initiating establishment of a radio connection, the UT transmits a connection request message to a satellite gateway (SGW) of the mobile satellite communications system, where the connection request message includes position information identifying a current location of the UT. The UT processes a connection setup message received in response to the connection request message, where the connection setup message includes a first tracking area identifier (TAID) that identifies a one of a plurality of tracking areas that is associated with the current location of the UT. The UT transmits a connection complete message to the SGW, together with an attach request message for a core network of the mobile satellite communications system, which includes the first TAID.

15 Claims, 16 Drawing Sheets

Related U.S. Application Data

(60) Provisional application No. 62/181,062, filed on Jun. 17, 2015.

(51) Int. Cl.
  *H04B 7/185* (2006.01)
  *H04W 88/16* (2009.01)

(58) Field of Classification Search
  CPC ....... G01S 19/40; G01S 5/14; H04B 7/18532; H04B 7/1851; H04B 7/195
  See application file for complete search history.

(56) References Cited

U.S. PATENT DOCUMENTS

| | | |
|---|---|---|
| 6,542,739 B1 | 4/2003 | Garner |
| 2002/0137509 A1 | 9/2002 | Laufer et al. |
| 2004/0024791 A1 | 2/2004 | Martin et al. |
| 2007/0192805 A1* | 8/2007 | Dutta ..................... H04H 20/74 725/64 |
| 2007/0252765 A1 | 11/2007 | Jayasuriya et al. |
| 2007/0281609 A1* | 12/2007 | Monte ................ H04B 7/18513 455/12.1 |
| 2008/0181108 A1 | 7/2008 | Hashmi et al. |
| 2010/0079333 A1 | 4/2010 | Janky et al. |
| 2010/0323705 A1* | 12/2010 | Iwamura ............... H04W 88/16 455/440 |
| 2011/0169688 A1 | 7/2011 | Wyler |
| 2013/0217422 A1 | 8/2013 | Zakaria et al. |
| 2013/0232565 A1 | 9/2013 | O'Connor et al. |
| 2013/0321206 A1 | 12/2013 | Chang |
| 2014/0022983 A1 | 1/2014 | Ravishankar et al. |
| 2014/0198709 A1 | 7/2014 | Chang |
| 2015/0024677 A1 | 1/2015 | Gopal et al. |
| 2015/0052360 A1 | 2/2015 | Ravishankar et al. |
| 2015/0147959 A1* | 5/2015 | Ha ........................ H04B 7/185 455/13.1 |
| 2015/0280810 A1 | 10/2015 | Beals et al. |
| 2016/0006500 A1 | 1/2016 | Radpour |
| 2016/0277096 A1* | 9/2016 | Wu ................... H03M 13/2906 |
| 2018/0376393 A1 | 12/2018 | Wu et al. |

* cited by examiner

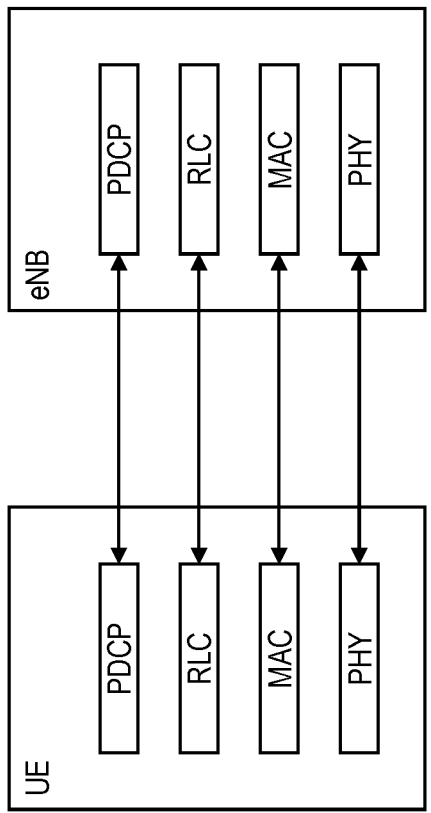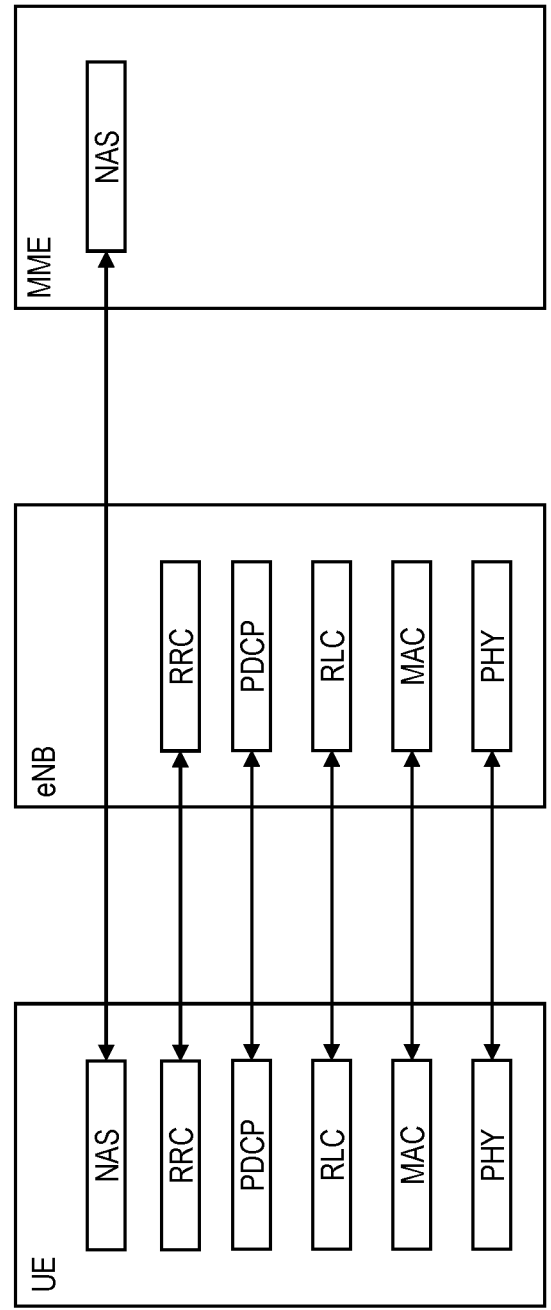

APPROACHES FOR HIGH SPEED GLOBAL PACKET DATA SERVICES FOR LEO/MEO SATELLITE SYSTEMS

RELATED APPLICATIONS

This application is a Continuation-In-Part (CIP), and claims the benefit of the earlier filing date under 35 U.S.C. § 120, from co-pending U.S. patent application Ser. No. 15/186,417 (filed Jun. 17, 2017), which claims the benefit of the earlier filing date under 35 U.S.C. § 119(e) from U.S. Provisional Application Ser. No. 62/181,062 (filed Jun. 17, 2015), the entireties of which are incorporated by reference herein.

BACKGROUND

Terrestrial communication systems continue to provide higher and higher speed multimedia (e.g., voice, data, video, images, etc.) services to end-users. Such services (e.g., Third Generation (3G) and Fourth Generation Long Term Evolution (4G LTE) systems and services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or coexist with terrestrial coverage depending on spectrum sharing rules and operator choice. With the advances in processing power of portable computers, mobile phones and other highly portable devices, the average user has grown accustomed to sophisticated applications (e.g., streaming video, radio broadcasts, video games, etc.), which place tremendous strain on network resources. Further, such users have grown to expect ubiquitous global coverage. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). Such high mobility, enhanced processing power of devices, and growth of low-latency applications, however, puts an immense strain on current terrestrial and satellite communications systems.

What is needed, therefore, is an approach for a low-earth-orbit-(LEO)/medium-earth-orbit-(MEO) multi-satellite communications system for efficiently providing high speed and high quality packet data services.

SOME EXAMPLE EMBODIMENTS

Embodiments of the present invention advantageously address the foregoing requirements and needs, as well as others, by providing an approach for providing high speed and high quality packet data services via a LEO/MEO satellite system. The LEO/MEO satellites may be processing satellites. When LEO/MEO satellites are processing satellites, IP packets and Layer 2 frames transmitted by user terminals are recovered at the satellite and transmitted on the gateway links and/or inter-satellite links. Similarly, in the direction from network to user terminal, IP packets and Layer 2 frames transmitted by gateways are recovered at the satellite and transmitted on the user links. The frequency and format of transmission on gateway and user links may be different. In addition, the transmission to and from user terminal on a user link may be different. Similarly, the transmission to and from gateway on a gateway link may be different. The architecture also permits transmission from user terminal to another user terminal directly without traversing through a gateway. Similarly, the architecture permits direct gateway to gateway communication via the satellite constellation. When LEO/MEO satellites are not processing satellites (i.e., they are bent-pipe satellites), communication is directly between user terminal and gateway with a frequency translation between gateway links and user links.

In accordance with example embodiments, an overall network architecture is shown in FIG. 1. The user terminal (UT) may be in one of a multiplicity of beams in the user link. Satellites, and therefore beams corresponding those satellites move (for satellite-fixed beams) over the user terminal as the LEO/MEO constellation moves even if the user terminal is not moving. Accordingly, beam-to-beam and satellite-to-satellite handover are required in this scenario. User terminals are typically equipped with a tracking antenna that is preferably electronically steered. However, the design does not preclude terminals using mechanical steering. In another embodiment, the satellite attempts to steer its antenna such that beams remain in the same place on the earth surface (also called earth-fixed beams). In this case, there is no need for beam-to-beam handover. The system also supports gateway to gateway handover to cater to cases where a user terminal may be in motion and it crosses from one gateway region to another. Gateway to Gateway handover would also be necessary when a Gateway fails or when the capacity of the gateway is such that it cannot accept any additional sessions. As part of the above mentioned beam-to-beam, satellite-to-satellite and gateway-to-gateway handovers, frequency handovers occur in a multiple frequency reuse system. To this end, the system design also supports frequency handover even when there is no beam-to-beam, satellite-to-satellite and gateway-to-gateway handovers; this will be the case when a frequency is deemed unusable due to interference and/or when it is required to move a terminal to a different frequency for resource usage efficiency issues and for services such as IP multicast.

Certain system features are as follows:

Powerful FEC coding, near theoretical channel performance;

Adaptive Coding & Modulation (ACM) improves throughput every channel condition;

Power-conserving design reduces power to enable battery/solar powered user terminal (sleep/wake paging cycle);

MAC layer design for efficient Bandwidth-on-Demand;

Support for Small and Large terminal types as well as fixed and mobile terminal types including Aeronautical and Maritime terminals;

Quality-of-Service (QoS) support for multiple service types;

Simplified satellite design to minimize technical and costs risks;

Simplified routing/switching function in the satellite using a centralized route determination function in each gateway that determines optimal routes. This removes the burden for satellite to be dynamically figuring out the routes;

Mobility Management functions enable beam, satellite, gateway and frequency handovers;

Scalable Gateway architecture to cater to different throughputs and different number of LEO/MEO satellites that it would need to communicate with;

Standard wireless and network protocols to utilize commercial implementations and evolution;

In accordance with example embodiments, a user terminal (UT) for a mobile satellite communications system is provided. The UT comprises at least one processor. When initiating establishment of a radio connection, the processor is configured to control the UT to transmit a connection request message to a first satellite gateway (SGW) of the mobile satellite communications system, wherein the connection request message includes position information identifying a current location of the UT and a UT identifier (UTID). The processor is further configured to process a connection setup message received by the UT in response to the connection request message, wherein the connection setup message includes a first tracking area identifier (TAID) that identifies a one of a plurality of tracking areas that is associated with the current location of the UT. The processor is further configured to, after processing the connection setup message, control the UT to transmit a connection complete message to the first SGW, together with an attach request message for a core network of the mobile satellite communications system, which includes the first TAID.

According to a further example embodiment of the UT, the processor is configured to control the UT to transmit a position verification message to the first SGW when the UT moves to a new location more than a predetermined threshold distance from its previously reported location, wherein the position verification message includes updated position information identifying a new location of the UT. The processor is further configured to process a response message received by the UT in response to the position verification message, which includes either the first TAID when the new location of the UT is associated with the one tracking area or a second TAID that identifies another of the plurality of tracking areas that is associated with the new location of the UT. The processor is further configured to determine whether the response message includes the first TAID or the second TAID, and to control the UT to transmit a tracking area update message to the first SGW for the core network when it is determined that the response includes the second TAID, wherein the tracking area update message includes the second TAID.

According to a further example embodiment of the UT, the processor is configured to control the UT to transmit a position verification message to the first SGW when the UT moves to a new location more than a predetermined threshold distance from its previously reported location, wherein the position verification message includes updated position information identifying a new location of the UT. The processor is further configured to process a handover command received by the UT from a second SGW of the mobile satellite communications system, wherein the handover command includes either the first TAID when the new location of the UT is associated with the one tracking area or a second TAID that identifies another of the plurality of tracking areas that is associated with the new location of the UT. The processor is further configured to determine whether the handover command includes the first TAID or the second TAID, and to control the UT to transmit a tracking area update message to the second SGW for the core network when it is determined that the response message includes the second TAID, wherein the tracking area update message includes the second TAID.

In accordance with further example embodiments, a method for managing tracking areas for a user terminal (UT) of a mobile satellite communications system is provided. The method comprises, when initiating establishment of a radio connection by the UT, transmitting, by the UT, a connection request message to a first satellite gateway (SGW) of the mobile satellite communications system, wherein the connection request message includes position information identifying a current location of the UT and a UT identifier (UTID). The method further comprises processing a connection setup message received by the UT in response to the connection request message, wherein the connection setup message includes a first tracking area identifier (TAID) that identifies a one of a plurality of tracking areas that is associated with the current location of the UT. The method further comprises transmitting, by the UT, a connection complete message to the first SGW, together with an attach request message for a core network of the mobile satellite communications system, which includes the first TAID.

According to a further example embodiment of the method for managing tracking areas for a UT, the method further comprises transmitting, by the UT, a position verification message to the first SGW when the UT moves to a new location more than a predetermined threshold distance from its previously reported location, wherein the position verification message includes updated position information identifying a new location of the UT. The method further comprises processing a response message received by the UT in response to the position verification message, which includes either the first TAID when the new location of the UT is associated with the one tracking area or a second TAID that identifies another of the plurality of tracking areas that is associated with the new location of the UT. The method further comprises determining whether the response message includes the first TAID or the second TAID. The method further comprises transmitting, by the UT, a tracking area update message to the first SGW for the core network when it is determined that the response message includes the second TAID, wherein the tracking area update message includes the second TAID.

According to a further example embodiment of the method for managing tracking areas for a UT, the method further comprises transmitting, by the UT, a position verification message to the first SGW when the UT moves to a new location more than a predetermined threshold distance from its previously reported location, wherein the position verification message includes updated position information identifying a new location of the UT. The method further comprises processing a handover command received by the UT from a second SGW of the mobile satellite communications system, wherein the handover command includes either the first TAID when the new location of the UT is associated with the one tracking area or a second TAID that identifies another of the plurality of tracking areas that is associated with the new location of the UT. The method further comprises determining whether the handover command includes the first TAID or the second TAID. The method further comprises transmitting, by the UT, a tracking area update message to the second SGW for the core network when it is determined that the response message includes the second TAID, wherein the tracking area update message includes the second TAID.

In accordance with further example embodiments, a mobile satellite communications system is provided. The system comprises one or more non-geosynchronous orbit satellites, a user terminal (UT), a first satellite gateway (SGW), and a core network. When initiating establishment of a radio connection, the UT is configured to transmit a connection request message to the first SGW, which includes position information identifying a current location of the UT and a UT identifier (UTID). The first SGW is configured to, after receiving the connection request message from the UT, determine, based on the position information, a one of a plurality of tracking areas that is associated with the current location of the UT, and to transmit a connection setup message back to the UT, which includes a first tracking area identifier (TAID) that identifies the one tracking area. The UT is configured to, after receiving the connection setup message from the first SGW, transmit a connection complete message to the first SGW, together with an attach request message for the core network, which includes the first TAID. The first SGW is configured to, after receiving the connection complete and attach request messages from the UT, transmit an initial UT message to the core network, which includes the first TAID.

According to a further example embodiment of the mobile satellite communications system, the UT is configured to transmit a position verification message to the first SGW when the UT moves to a new location more than a predetermined threshold distance from its previously reported location, wherein the position verification message includes updated position information identifying a new location of the UT. The first SGW is configured to, after receiving the position verification message from the UT, determine, based on the updated position information, which of the plurality of tracking areas is associated with the new location of the UT, and to transmit a response message back to the UT, which includes either the first TAID when the new location of the UT is associated with the first tracking area or a second TAID that identifies another of the plurality of tracking areas that is associated with the new location of the UT. The UT is configured to, after receiving the response message from the first SGW, determine whether the response message includes the first TAID or the second TAID, and to transmit a tracking area update message to the first SGW for the core network when it is determined that the response includes the second TAID, wherein the tracking area update message includes the second TAID. The first SGW is configured to, after receiving the tracking area update message from the UT, transmit the tracking area update message, including the second TAID, to the core network.

According to a further example embodiment of the mobile satellite communications system, the UT is configured to transmit a position verification message to the first SGW when the UT moves to a new location more than a predetermined threshold distance from its previously reported location, wherein the position verification message includes updated position information identifying a new location of the UT. The first SGW is configured to, after receiving the position verification message from the UT, determine, based on the updated position information, whether a handover to a second SGW is required. When the first SGW determines that the handover to the second SGW is required, (i) the first SGW is configured to transmit a handover message to the second SGW, including the UTID and the updated UT position information, (ii) the second SGW is configured to, after receiving the handover message from the first SGW, determine, based on the updated position information, which of the plurality of tracking areas is associated with the new location of the UT, and to transmit a handover command to the UT, which includes either the first TAID when the new location of the UT is associated with the first tracking area or a second TAID that identifies another of the plurality of tracking areas that is associated with the new location of the UT, (iii) the UT is configured to, after receiving the handover command message from the first SGW, determine whether the handover command message includes the first TAID or the second TAID, and to transmit a tracking area update message to the second SGW for the core network when it is determined that the handover command message includes the second TAID, wherein the tracking area update message includes the second TAID, and (iv) the second SGW is configured to, after receiving the tracking area update message from the UT, transmit the tracking area update message, including the second TAID, to the core network.

According to a further example embodiment of the mobile satellite communications system, the position verification message is transmitted to the first SGW via at least a first of the one or more non-geosynchronous orbit satellites, and the second SGW is associated with at least a second of the of the one or more non-geosynchronous orbit satellites. The second SGW is configured to, after receiving the SGW handover message from the first SGW, transmit a satellite handover message to the second satellite. The second satellite is configured to, after receiving the satellite handover message from the first SGW, transmit a satellite handover response message back to the second SGW, which includes satellite handover parameters. The handover command message is transmitted by the second SGW to the UT via the first SGW and at least the first satellite, and the tracking area update message is transmitted by the UT to the second SGW for the core network via at least the second satellite.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 2A illustrates the user plane protocol architecture of a 4G long-term evolution (LTE) terrestrial system;

FIG. 3A illustrates the control plane protocol architecture of a 4G long-term evolution (LTE) terrestrial system;

DETAILED DESCRIPTION

Figure 1:
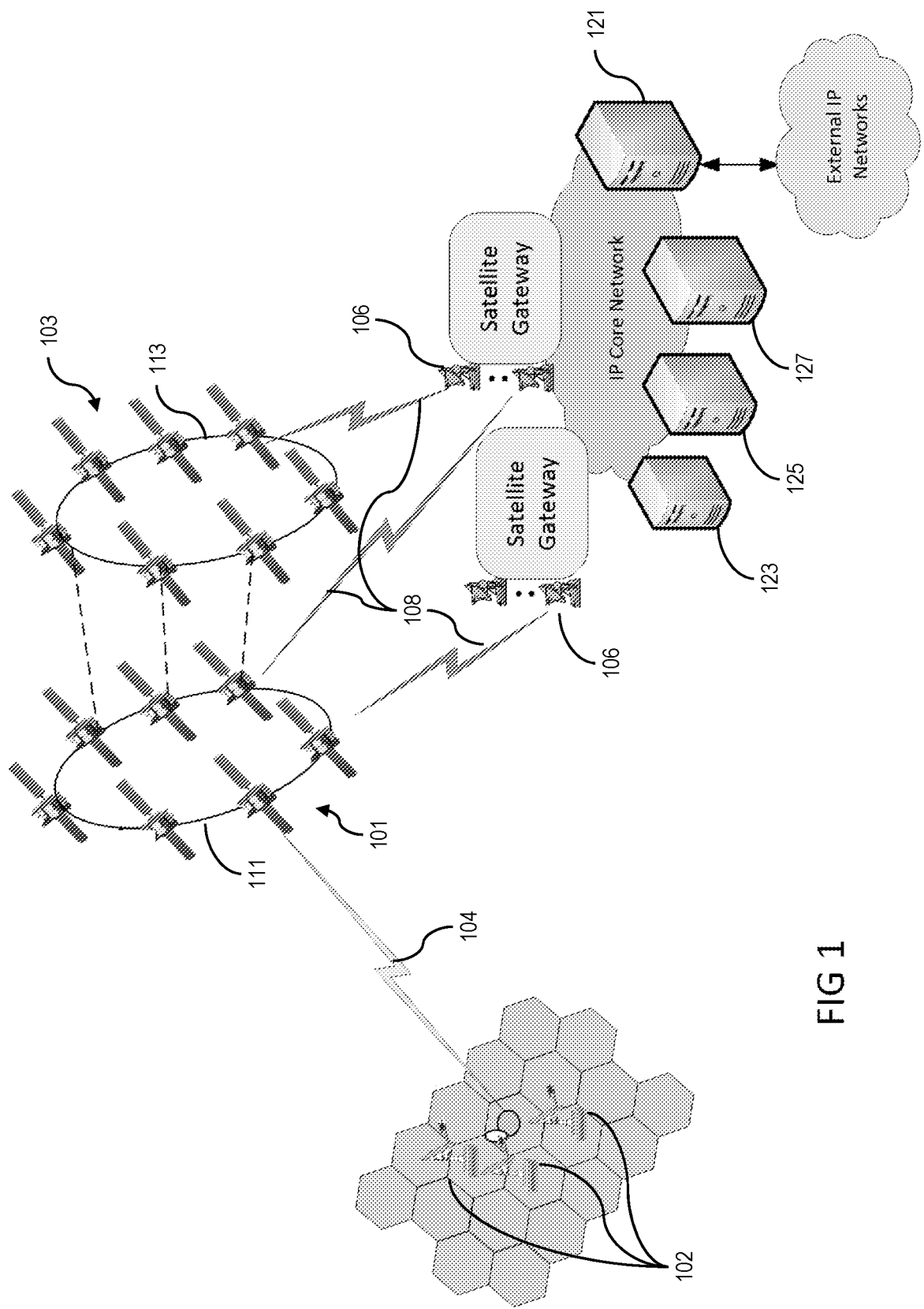
FIG. 1 illustrates the high-level architecture of a low earth orbit (LEO)/medium earth orbit (MEO) satellite system, according to example embodiments.

System architectures and associated processes for providing high speed and high quality packet data services via a LEO/MEO satellite system are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Architecture

FIG. 1 illustrates the high-level architecture of a low earth orbit (LEO)/medium earth orbit (MEO) satellite system, according to example embodiments. The system may include, for example, a constellation of satellites including multiple satellites at each of multiple different orbits, such as LEO and MEO orbits 101, 103. Each of the satellites of an orbital group may include the capability of performing data communications via inter-satellite communications links 111, 113 with other satellites within the same orbital group, and one or more of the satellites of each orbital group may include the capability of performing data communications via intersatellite links 115a, 115b, 115c with other satellites within a different orbital group. Further, each of the satellites of the constellation may include the capability of performing data communications with user terminals 102 via one or more communications links 104. By way of example, such communications links 104 may be at Ku and/or Ka band (and optionally L and/or S band). The satellite gateways 106 may communicate via the LEO/MEO satellite constellation (e.g., via the one or more communications links 108) or via a GEO satellite system (not shown in the Figure). By way of example, such communications links 108 may be at C, Ka, Q and/or V band. The IP core network may resemble that of a classical 4G-LTE network with a Border Gateway 121 playing the role of the packet data network (PDN) Gateway (PGW) of the LTE core network. The system may further include a subscription server 123 (equivalent to the Home Subscription Server or HSS of a 4G LTE core network), a Management Server 125 (equivalent to the MME of a 4G LTE core network) and a Security Server 127 (equivalent to the AuC of a 4G LTE core network). Although the Serving Gateway (SGW) is not explicitly shown, the network may include an SGW, which for example may be part of the Satellite Gateway and/or the PGW.

Figure 2B:
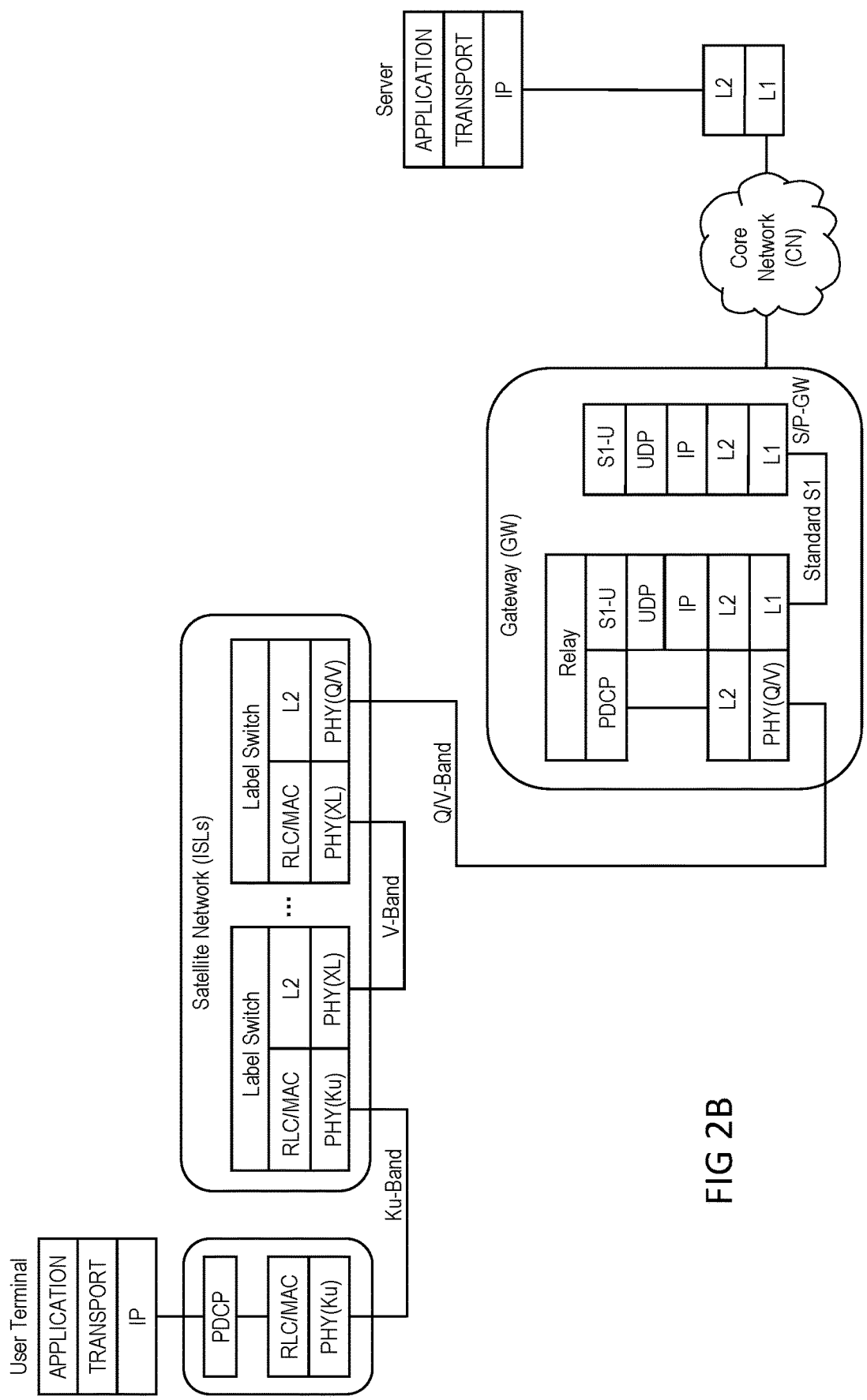
FIG. 2B illustrates the user plane protocol architecture fora LEO/MEO satellite system, according to example embodiments.

FIG. 2A illustrates the user plane protocol architecture of a 4G long-term evolution (LTE) terrestrial system. FIG. 2A shows the protocol layers within, and respective interfaces between, the user terminal (UE or UT) and the base station (eNodeB or eNB). FIG. 2B illustrates the user plane protocol architecture for the implementation of 4G over a LEO/MEO satellite system, according to example embodiments. FIG. 2B shows the distribution of protocol layers or functions across the system—e.g., between the satellites (and potentially across inter-satellite links (ISLs)) and the satellite gateway (GW). Unlike terrestrial 4G LTE systems where all layers of the protocol stack are implemented in a single entity called eNodeB (eNB in FIG. 2A), the protocol layers are distributed across different elements, some in satellite and some in ground. This distribution of protocol functions is configured to advantageously locate certain functions to serve different purposes in the LEO/MEO satellite system as compared to the similar functions of a terrestrial system. For example, the distribution of the protocol functions effectively hides the dynamics of the satellite movement and satellite handovers from the core network, so the core network interfaces with the GW in the same manner as in a terrestrial LTE or 4G network. Further, the described concepts of the distribution of protocol layers and functions across a LEO/MEO satellite network (or a network that includes other moving airborne communications platforms (e.g., high altitude platforms or HAPS)) are not limited to 4G LTE, and may be applied to other terrestrial communications protocols or standards implemented within such network types. As mentioned in the next paragraph, these layers are positioned across different elements of the architecture based on complexity and service demands. In the least complex satellite case, all protocol layers are implemented on the ground. This leads to longer signaling and traffic delays and does not readily permit inter-satellite links to be used. In the highest complexity case all layers are implemented on the satellite. This leads to shorter signaling and traffic delays, it lends to digital inter-satellite links (ISL) and allows direct communication between two user terminals. It is also noted that in FIG. 2B, the path between user terminal and its peer entity (Gateway or another user terminal) uses label switching. This is primarily to switch paths efficiently rather than have a full blown IP routing. However the architecture does not preclude the use of IP routing at a cost of higher complexity. Further, as also shown in FIG. 2B, the interface from the satellite system eNodeB (referred to herein as the eNB') to the GW is a standard S1-U interface, which also supports the use of commercial off-the-shelf (COTS) core network elements. Similarly, all interfaces within the core network and to/from the core network are based on 4G LTE standards.

Figure 3B:
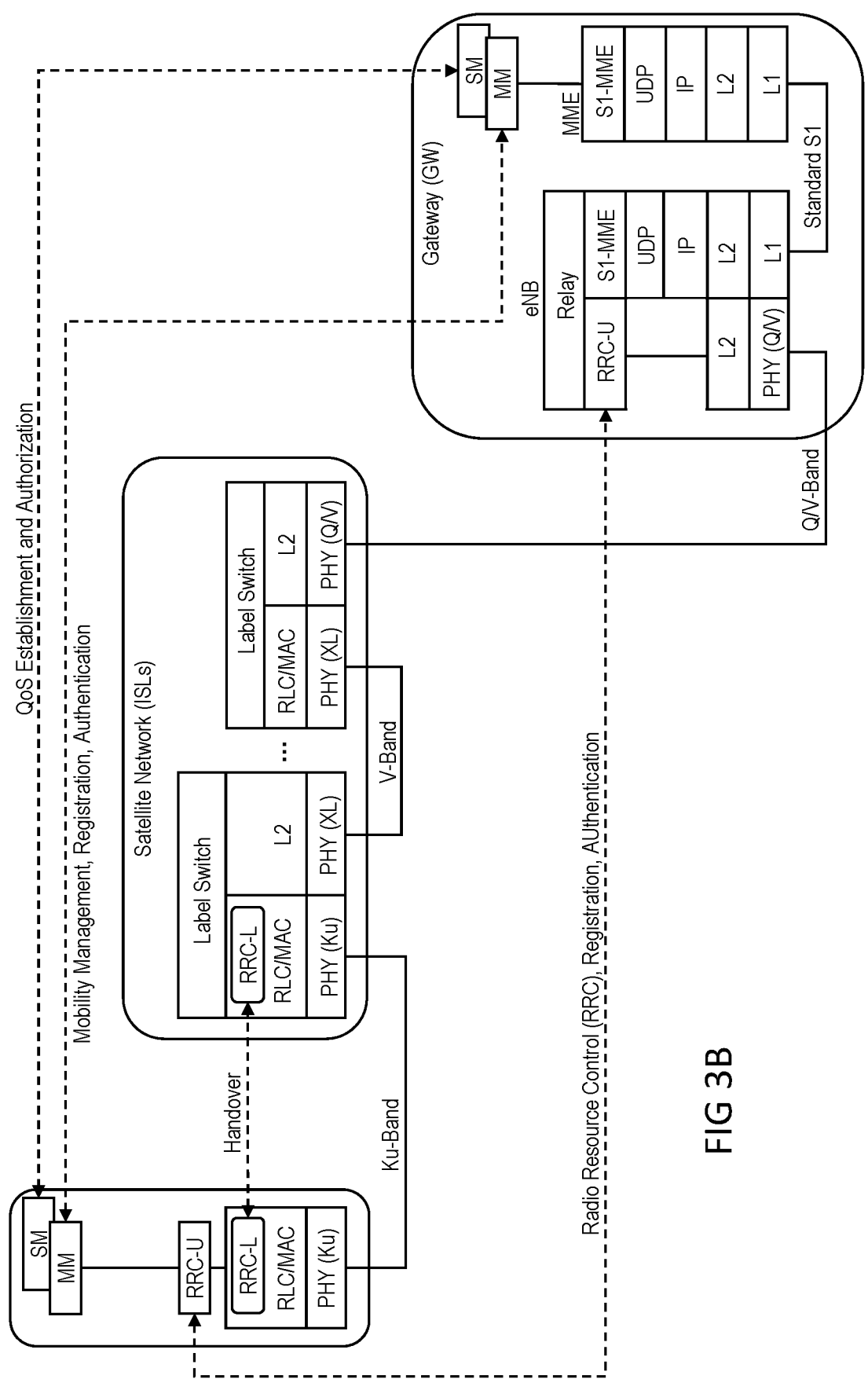
FIG. 3B illustrates the control plane protocol architecture for a LEO/MEO satellite system, according to example embodiments.

FIG. 3A illustrates the control plane protocol architecture of a 4G long-term evolution (LTE) terrestrial system. FIG. 3A shows the protocol layers within, and respective interfaces between, the UE, the eNB and the mobility management entity (MME). FIG. 3B illustrates the control plane protocol architecture for the implementation of 4G over a LEO/MEO satellite system, according to example embodiments. Similar to user-plane discussion above, this has resemblance to the control plane 4G LTE protocol architecture (FIG. 3A), including the following differences: (i) the satellite system protocol architecture for the control plane is similar to that of the terrestrial 4G-LTE control plane protocol architecture shown in FIG. 3A; (ii) the PHY, MAC/RLC and RRC layers are optimized for the satellite environment; (iii) when the satellites involved are not processing satellites, the eNB' functions are implemented in a satellite gateway. Alternatively, for systems that have processing satellites, the protocol architecture of the control plane for the satellite system have the following differences: (i) the PHY layer is moved to the communicating LEO/MEO satellite on the user link; (ii) the MAC/RLC, RRC and PDCP may be located in satellite or gateway depending on permitted complexity of the satellites, and whether mesh connectivity between user terminals is provided. Further, given that the PHY, MAC/RLC and PDCP are common layers in user plane and control plane stack, it follows that the placement of these layers are common to user plane and control plane. The entity in the GW performing these functions is referred to herein as the eNB'.

When the RRC is implemented in satellite, the RRC is divided into RRC-L (RRC-Lower) and RRC-U (RRC-Upper) layers; RRC-L is located in the satellite and is responsible for handover signaling with UT. The RRC-U is located in the eNB', and is responsible for resource management functions including admission control. The advantage of placing RRC-L in the satellite is that the gateways need not be involved in such handovers which makes the execution of handovers fast and efficient. The RRC-U communicates with PDCP layer in the eNB' to configure security, header compression and data compression schemes. In FIG. 3B, although Ku band is depicted for the user link, system design embodiments also facilitate use of Ka band or L/S bands for improved availability. As also shown in FIG. 3B, the interface from the eNB' to the GW again is a standard S1-U interface. Similarly, the interface from the eNB' to the MME is a standard S1-MME interface. These features permit the use of COTS core network elements. Similarly, all interfaces within the core network, and to/from core network, here also, are based on 4G LTE standards.

Figure 4A:
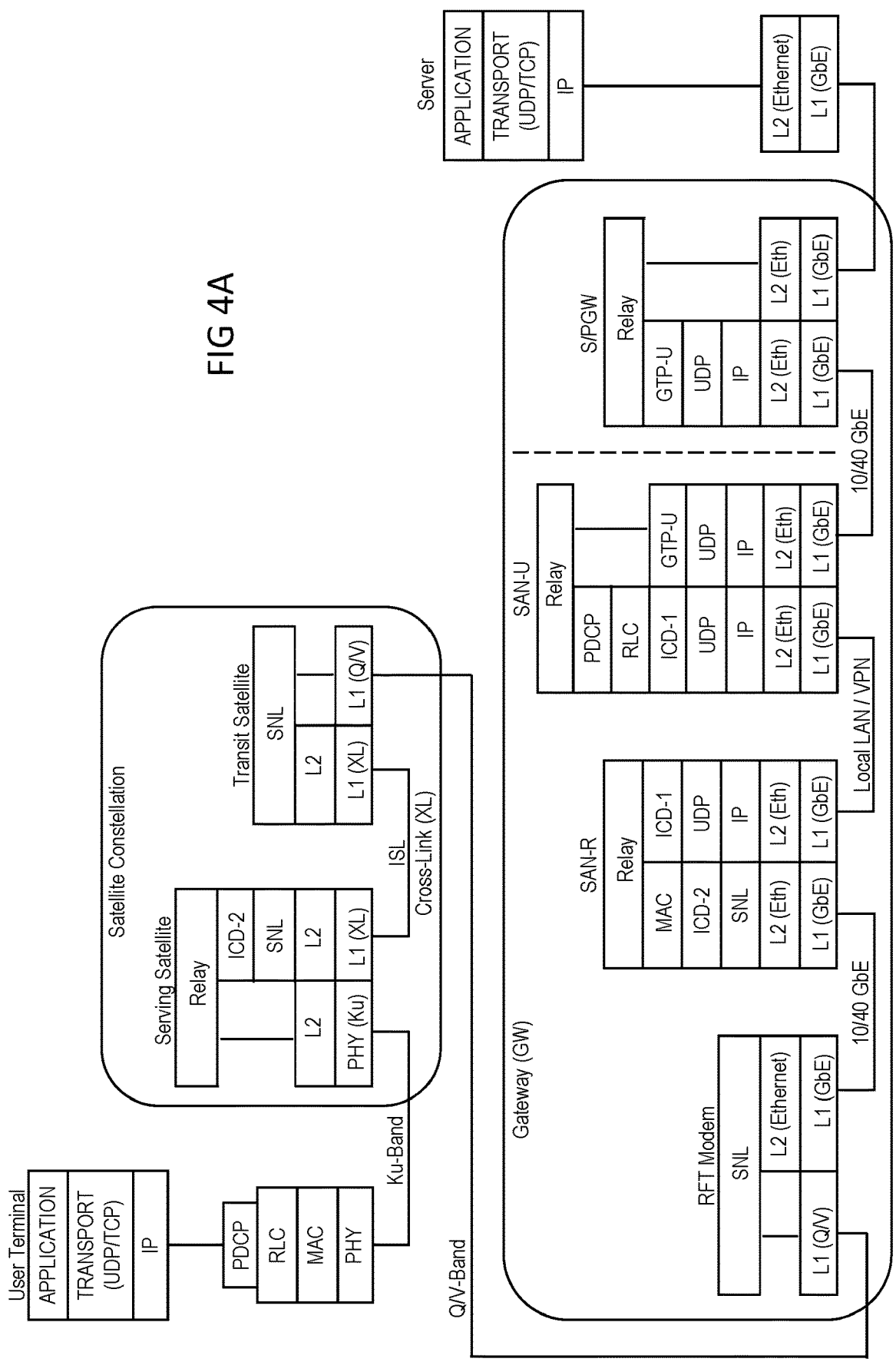
FIGS. 4A and 4B illustrates alternate distribution of protocol layers in user plane and control plane protocol architecture for a LEO/MEO satellite system, according to example embodiments
Figure 4B:
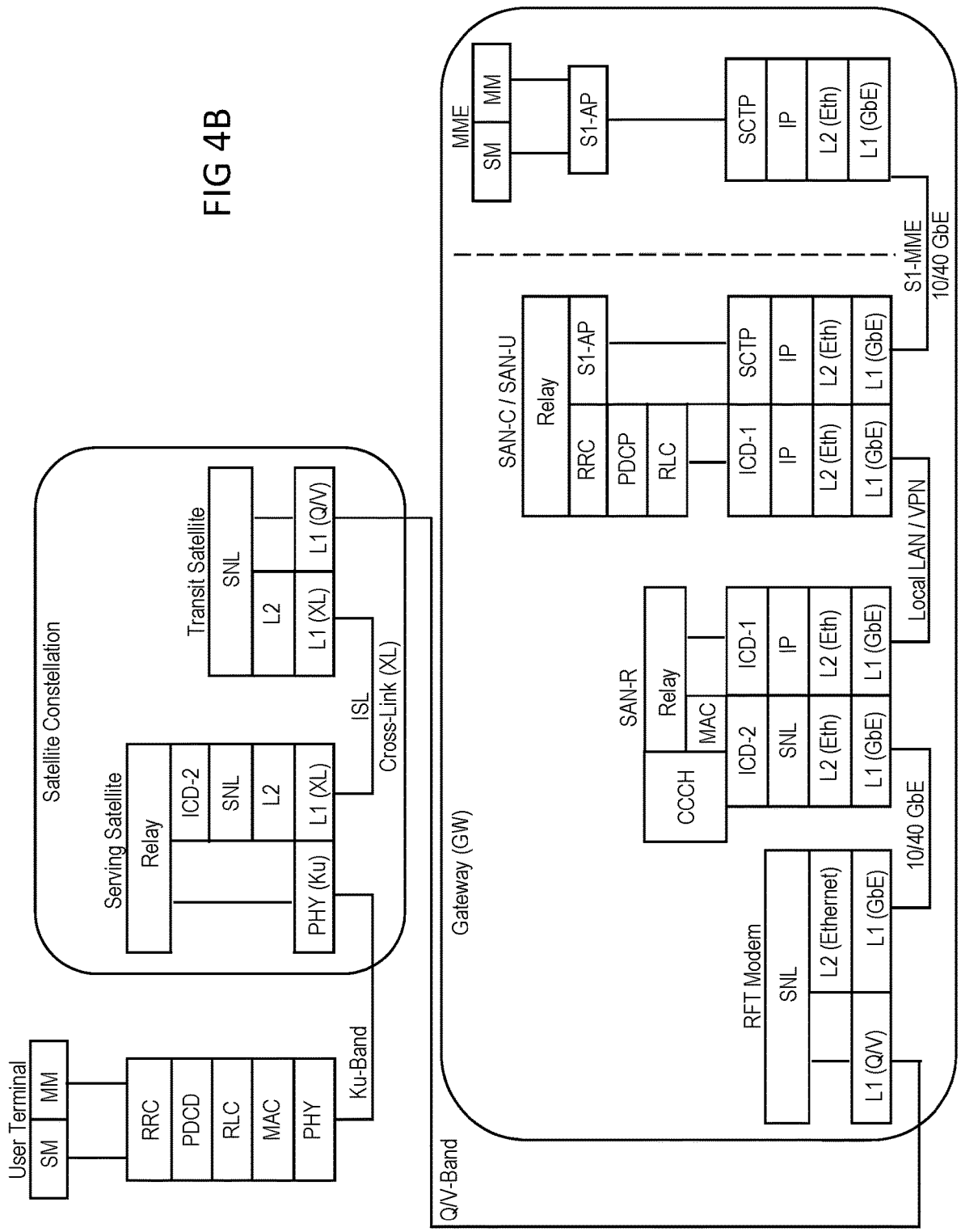

FIG. 4A and FIG. 4B show an alternate embodiment for user plane and control plane where the PHY is shown in the satellite, the MAC layer is shown in the radio part of SAN (SAN-R: Satellite Access Network—Radio part), the RLC, PDCP and RRC are shown in the SAN-C/SAN-U (SAN-Control and SAN-User parts), which is either locally connected to SAN-R via a local area network (LAN) or remotely connected to the SAN-R via a virtual private network (VPN). Whereas, in FIGS. 3A and 3B, the RLC and MAC layers were located in the satellite. This type of a split is unique to LEO/MEO satellite systems since it partitions the layers that need to be impacted due to satellite constellation movement from layers that should not be impacted by constellation movement. For example, the ciphering that the PDCP uses between the UT and eNB' is independent of the radio path (satellite) with which the UT or Gateway is communicating—therefore, the PDCP is moved away from the SAN-R and is placed at an anchor point in the SAN-C/SAN-U. Similarly, the resource management aspects of the radio resource control (RRC) layer is signaling between the UT and Gateway, which occurs independent of the radio path. The MAC layer, however, is closely tied to the physical path since the scheduler in the MAC layer has to schedule users active on the signal path and hence is closer to the satellite—either in the SAN-R or on the satellite.

Figure 5:
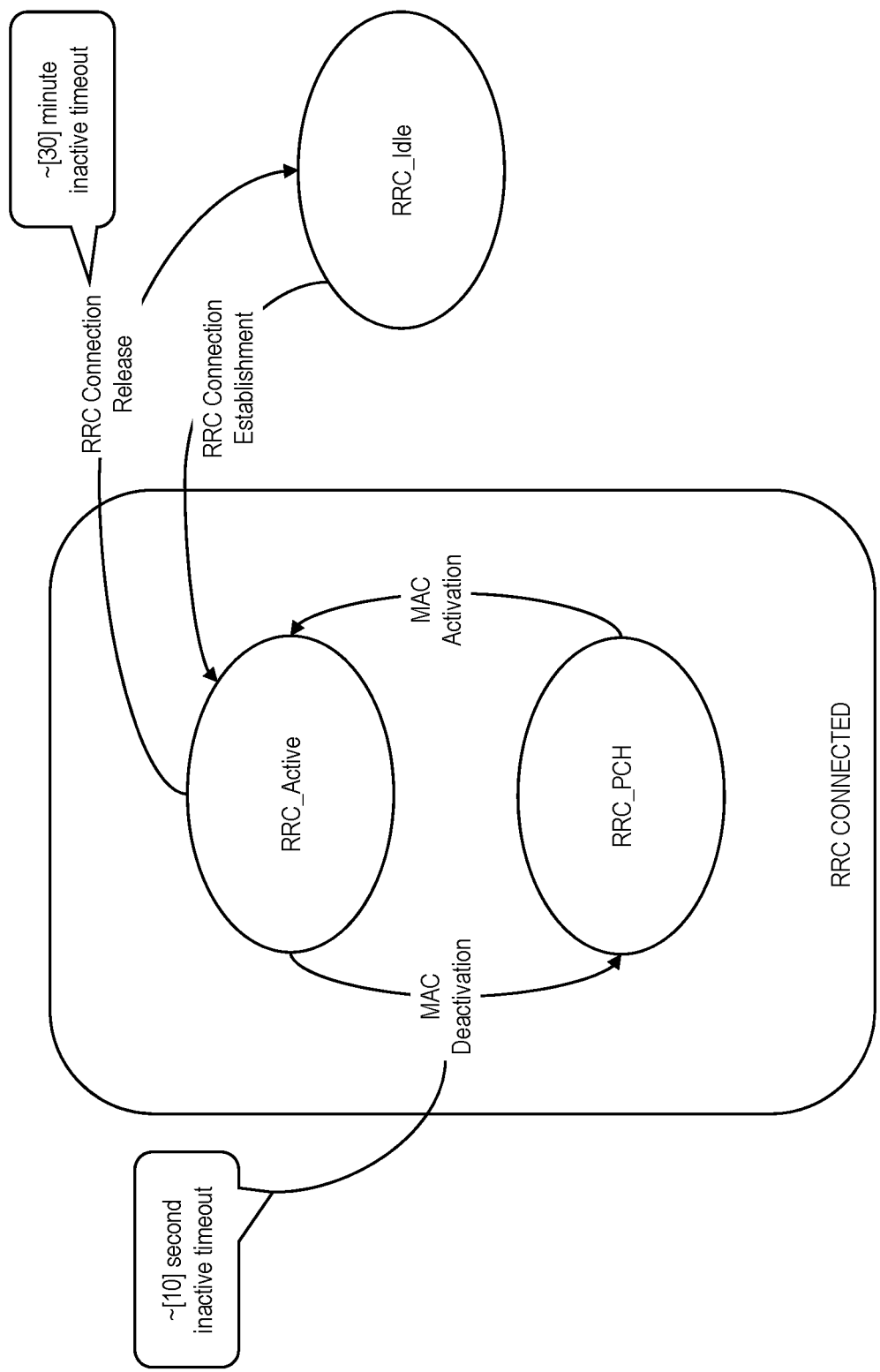
FIG. 5 illustrates an example RRC state diagram, according to example embodiments.

Another aspect of the invention is the introduction of a new sub-state to the RRC-CONNECTED. By contrast, in the terrestrial LTE standard, there are only the two states—RRC Connected and RRC Idle. According to example embodiments of the present invention, however, the RRC Connected state has been split into two sub-states, called the RRC Paging Channel (RRC_PCH) and RRC_Active states, as illustrated in FIG. 5. In the RRC-PCH state, the UT is not assigned any radio resources, but the UT maintains a signaling connection to the core network. Via this signaling connection, while in the RRC_PCH state, the UT listens to the broadcast control channel (BCCH) and the paging channel (PCH). Since the signaling connection to the core network exists in the RRC-PCH state, the UT is able to establish connectivity with the network much faster, without needing to go through the service request signaling procedures, which not only consume more radio resources but also take a longer time (especially in a satellite network). While in the RRC_Active state, after a specific timeout (e.g., 10 seconds), the MAC is deactivated and the UT transitions to the RRC_PCH state. While in the RRC_PCH state, if downlink data arrives for the UT, then the SAN pages the UT, and the UT resumes the RRC_Active state to receive the data (as shown in FIG. 6F—SAN Originated Paging—RRC_PCH State). Similarly, while in the RRC_PCH state, if the UT is activated for the transmission of uplink data (e.g., the user activates a web-link to retrieve the data from the respective website), then the UT initiates MAC activation and transitions to the RRC_Active state to transmit the data (as shown in FIG. 6E—UT Originated MAC Activation). Otherwise, after a predetermined timeout period (e.g., 30 minutes), the UT transitions to the RRC_Idle state. While in the RRC_Idle state, if the Core Network has data for the UT, the Core Network initiates a paging of the UT (as shown in FIG. 6D—Core Network Originated Paging—RRC_IDLE State). In terrestrial LTE, when radio resources are removed, the UT is moved to the RRC-IDLE state where there is no signaling connection to the core network, and the UT listens to the BCCH and PCH.

RRC_Active to RRC_PCH

When the UT is idle for a short period of time (e.g., on the order of 10 or a few 10's of seconds), it transitions to RRC_PCH state. When the UT is idle for an extended period of time (e.g., a few or a few 10's of minutes—such as 30 minutes), it transitions from RRC_PCH to RRC IDLE. FIG. 6C depicts a signal flow diagram illustrating an RRC transition to idle mode, according to example embodiments. The SAN-R detects (Temporary Block Flow) TBF inactivity and signals to the UT that the TBFs are being released through MAC signaling. When the TBF Release has been acknowledged by the UT, the SAN-R removes the MAC layer state for the UT and informs the SAN-U. The SAN-U removes its references to the SAN-R for this UT and informs the SAN-C that the MAC has become inactive. The RBs, RLC and PDCP contexts remain. The SAN-C changes the RRC state to RRC_PCH. The SAN-RU reference is cleared, but the rest of the UT context is retained in this RRC_PCH state, which permits UT to quickly establish connectivity with the network without needing to execute NAS procedures. On extended inactivity, the SAN indicates to the EPC (MME) that it wishes to release the UE context by sending a UE Context Release Request with cause "user inactivity." The MME sends a S1 UE Context Release Command. The SAN triggers SAN originated paging. When the UT responds, the SAN sends the UT an RRC Connection Release. The UT transitions to RRC IDLE and sets its DRX interval to the default value. The SAN sends the MME a S1 UE Context Release Complete. The SAN also stores the UT's S-TMSI and last reported position in a database for use in idle mode paging.

RRC Connection Establishment—RRC_Idle to RRC_Active

Figure 6A:
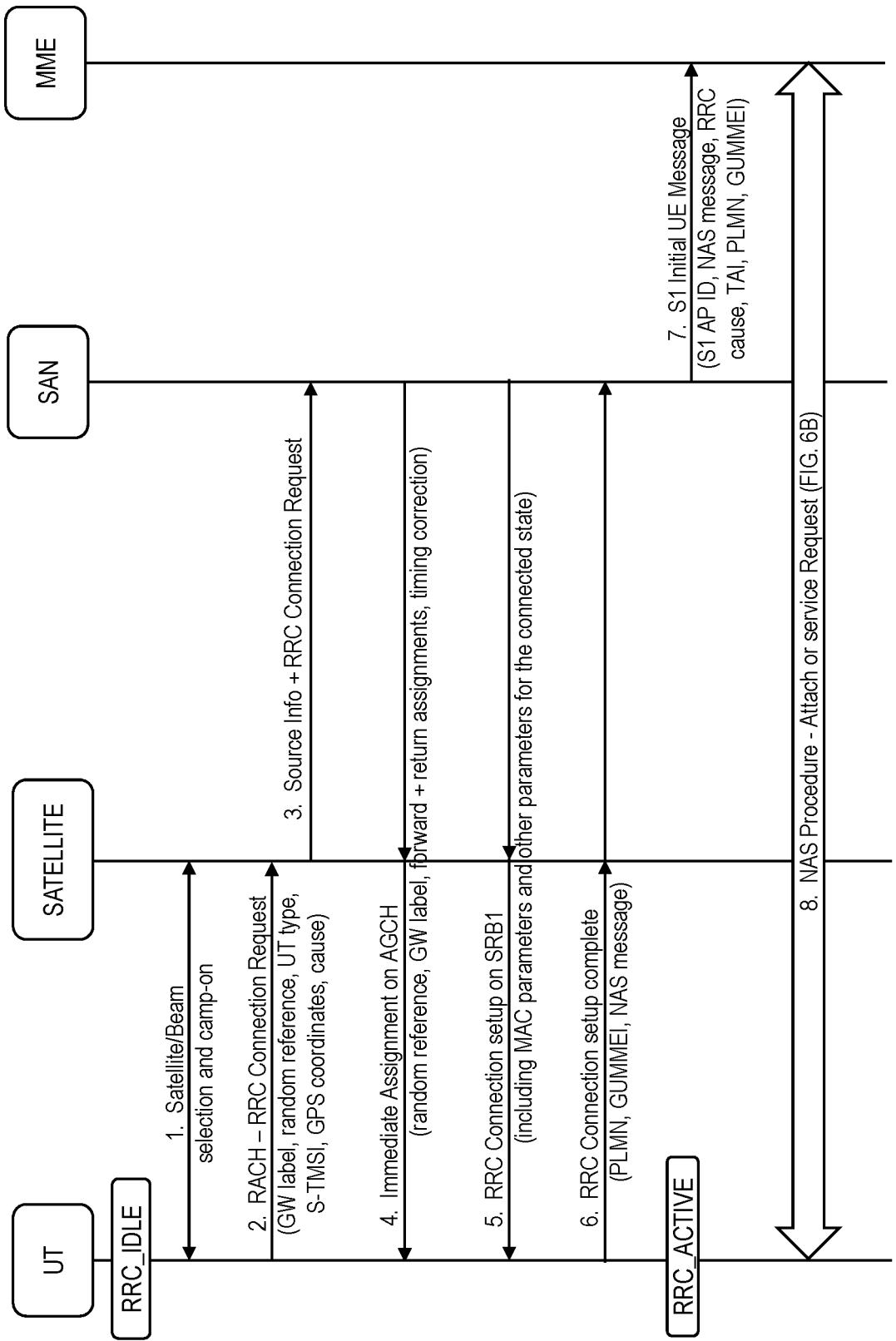
FIG. 6A depicts a signal flow diagram illustrating RRC connection establishment, according to example embodiments.

FIG. 6A depicts a signal flow diagram illustrating RRC connection establishment, according to example embodiments. Here user terminal provides its location information (e.g., GPS coordinates) for the network to determine and assign the appropriate GW for servicing the UT, and also determine whether the UT is located in a place where there are restrictions. As shown in step 2, the UT transmits its position (GPS coordinates) as part of the RRC connection establishment message (the RRC Connection Request message). The UT may also transmit a GW Label (if one has been provided to it previously), which eliminates the need for the satellite to determine the GW at the time of every RRC connection establishment attempt, especially if the UT has not moved significantly. As also shown in step 2, the UT transmits its S-TMSI identifier (if one had been provided previously to the UT), which allows the GW to store the UT position along with the UT S-TMSI. For a processing satellite, in step 3, the satellite receives the RACH and examines the GW ID in the label. If null, it fills in the default GW Label to be used for the Random Access Channel (RACH) (which points to the SAN-RC). The satellite also adds the source info identifying the (satellite, beam, carrier, frame, slot) and forwards it to the SAN-RC (e.g., which may be via one or more ISLs and other respective satellites).

Figure 6B:
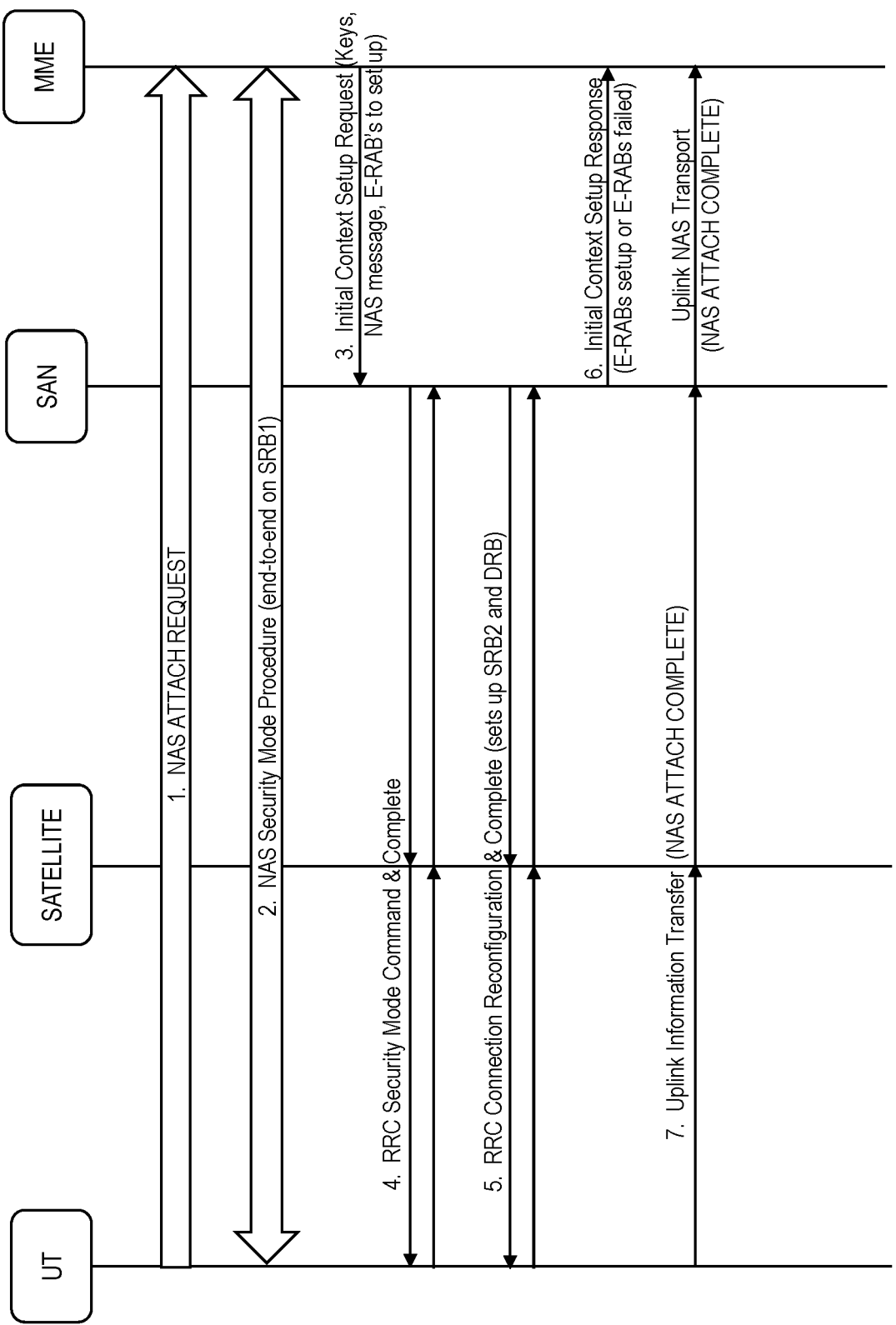
FIG. 6B depicts a signal flow diagram illustrating an RRC attach and bearer setup procedure, according to example embodiments.
Figure 6C:
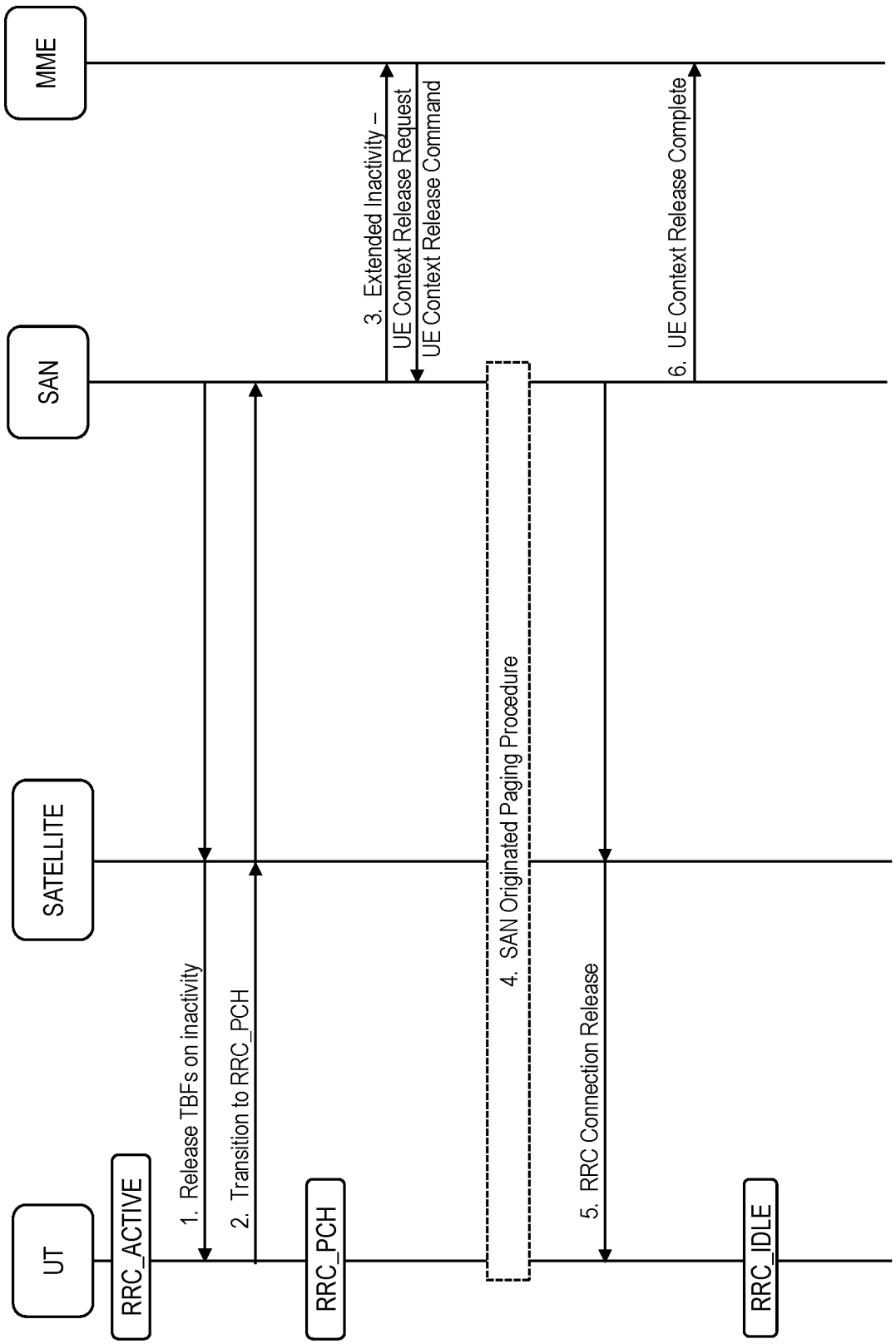
FIG. 6C depicts a signal flow diagram illustrating an RRC transition to idle mode, according to example embodiments.
Figure 6D:
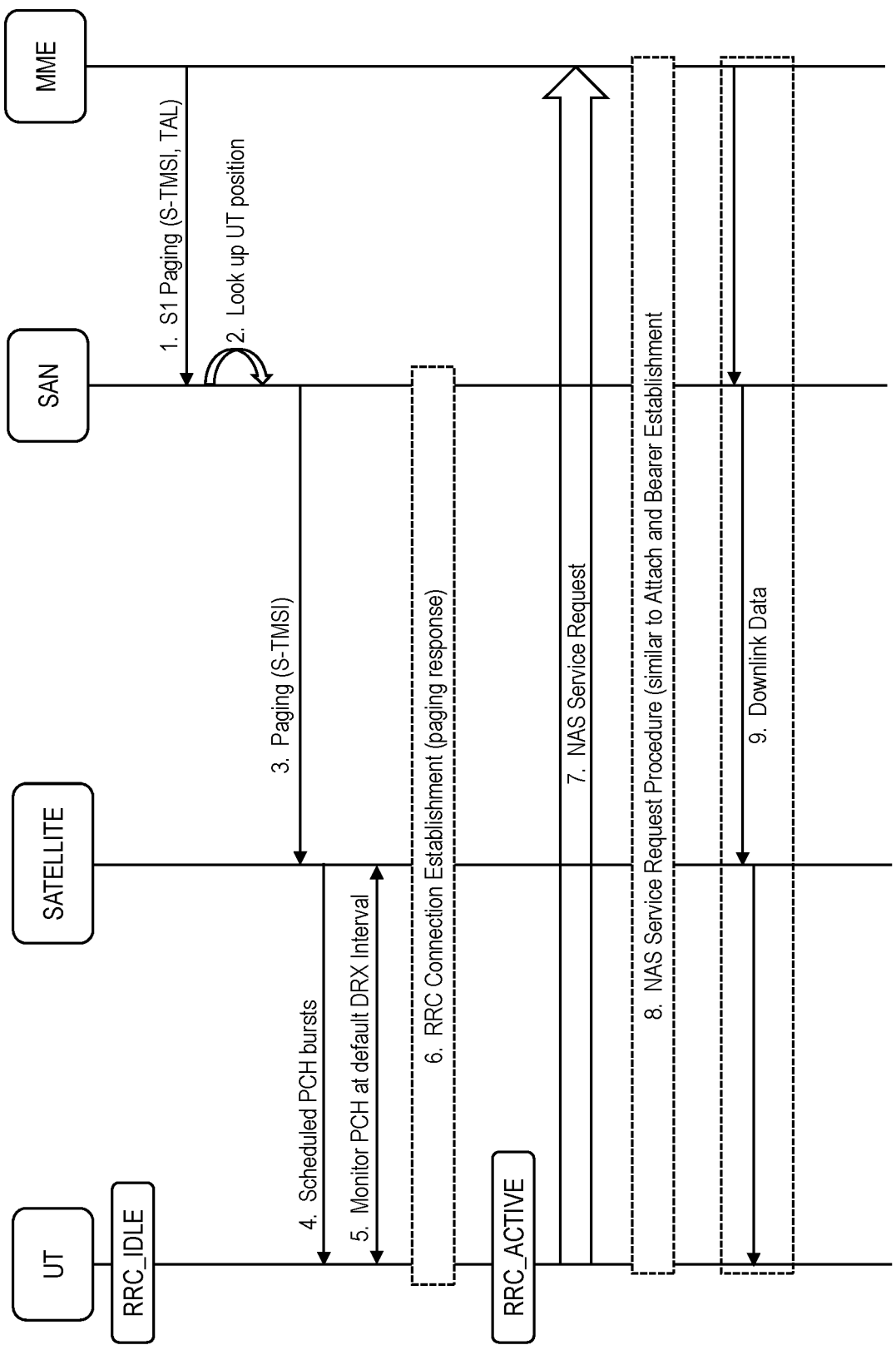
FIG. 6D depicts a signal flow diagram illustrating RRC EPC originated paging, according to example embodiments.
Figure 6E:
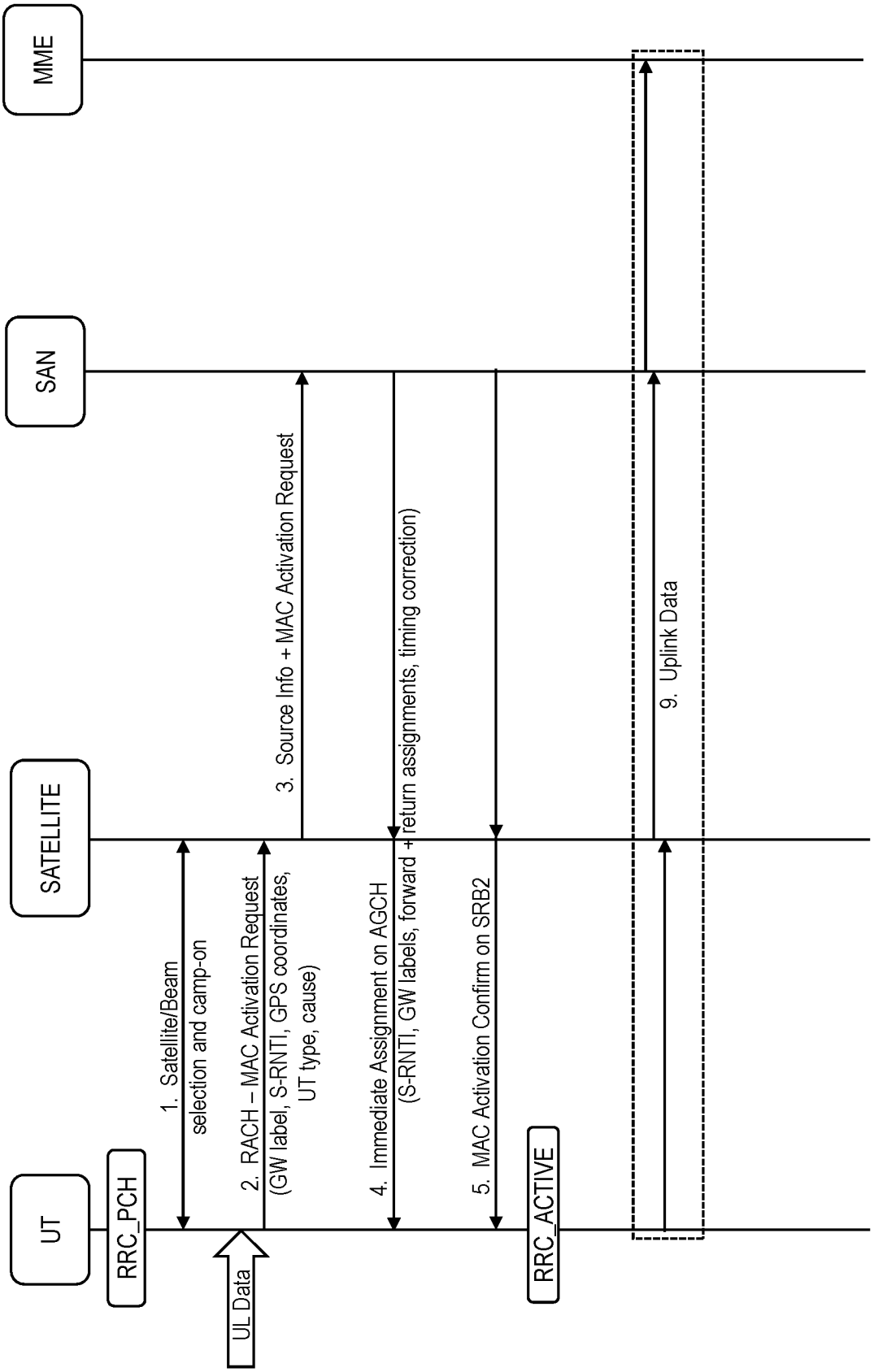
FIG. 6E depicts a signal flow diagram illustrating an RRC user terminal originated MAC activation, according to example embodiments.
Figure 6F:
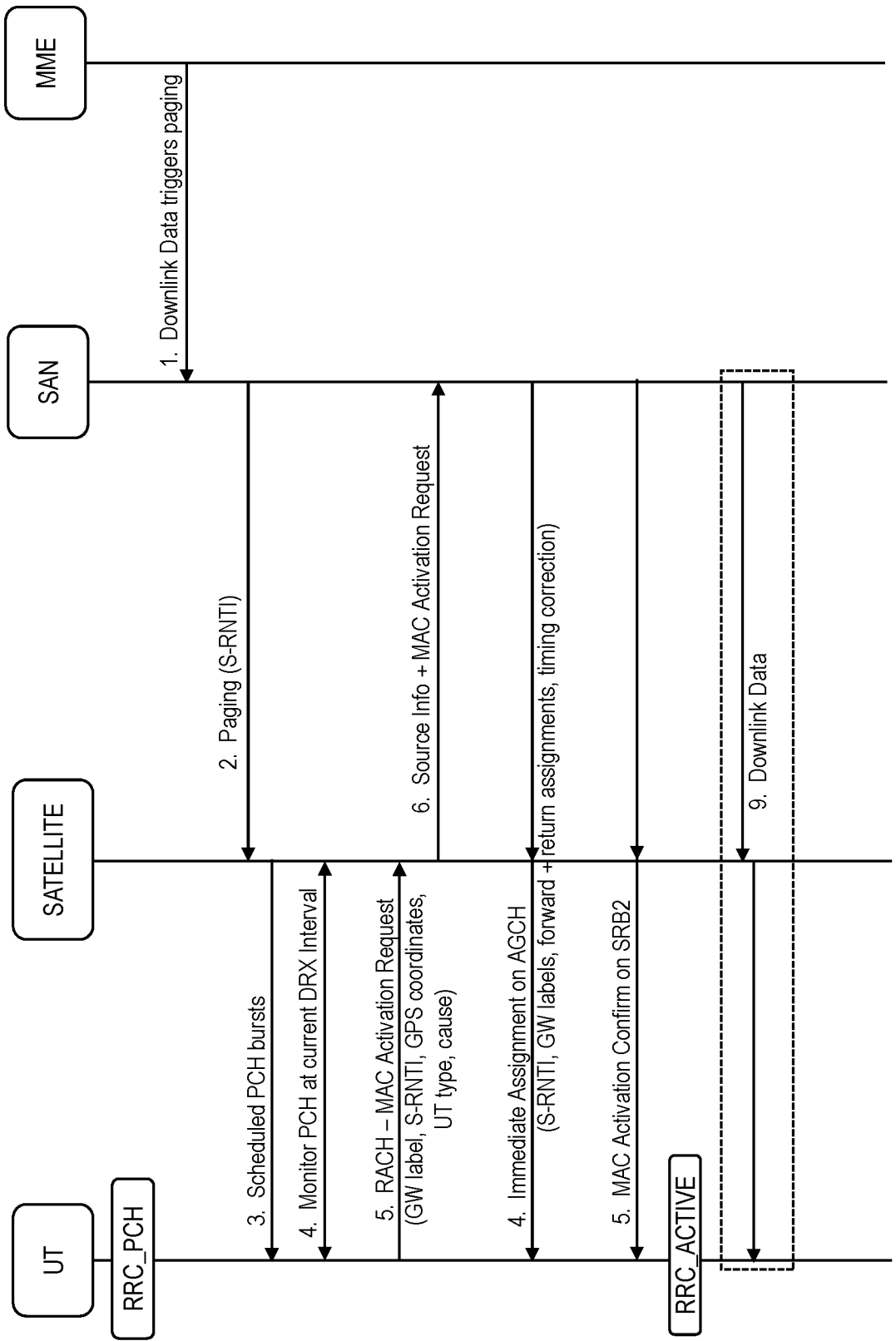
FIG. 6F depicts a signal flow diagram illustrating an RRC SAN originated paging, according to example embodiments.

The SAN-R processes the RACH, which includes checking the UT coordinates to determine/confirm the home GW and determine the Tracking Area, fetching the UT satellite/beam trajectory and determining the SAN-C instance responsible for the UT. The determination of the SAN-C instance may also take into account or apply load balancing so that a single processor is not overloaded to process traffic of all UTs in a given Tracking Area. The SAN-RC then forwards the request with all this data to the SAN-C. The SAN-C then performs connection admission and creates the UT context, stores the position and trajectory, and assigns the UT identifier (S-RNTI). In step 4, the SAN-C sends the Immediate Assignment on the Access Grant Control Channel (AGCH) to the UT via the satellite. The Immediate Assignment includes timing correction, forward and return timeslot assignments and MAC ID. The Immediate Assignment also includes the GW Label identifying the particular GW servicing the UT. In step 5, the SAN-C sends the RRC Connection Setup message on SRB1 via the satellite to the UT, which includes the MAC layer parameters for the UT, and other parameters needed for the connected state (e.g., information about upcoming beam and satellite handovers). This message also includes the Tracking Area Identifier (TAI) that is provided to UT in order to assist UT in idle mode and connected operation. In step 6, the UT returns the RRC Connection Setup Complete message to the SAN. The NAS message that is embedded in step 6, when it contains an ATTACH or SERVICE REQUEST, initiates the corresponding RRC attach and bearer setup procedures illustrated in FIG. 6B (which are similar to the respective procedures described in 3GPP TS 23.401). In step 7, the SAN transmits the S1 Initial UE Message to the MME, which includes the determined TAI and the S1 AP ID.

Accordingly, in such LEO/MEO satellite system embodiments, the UT assists the satellite with routing of the individual messages/packets from the UT to the correct GW (the GW servicing the UT, where the respective UT context is stored) by providing the GW Label. Such information enables the current satellite servicing the UT to forward all packets from that UT to the proper GW (even when the routing involves one or more other intermediary satellites via respective ISL(s)). Further, each time that the UT is handed-over to a new satellite (due to the movement of the LEO/MEO satellites) the new satellite will be able to route the UT packets to the proper GW.

With regard to the Core Network (CN), the CN operates based on only the two states of the UT—RRC_Idle and RRC_Active. When the CN has data to send to the UT and the UT is in the RRC_Idle state, the CN (via the MME) must initiate the paging of the UT to return the UT to a connected state (RRC_Connected). Alternatively, when the CN has data to send to the UT and the UT is in the RRC_Connected state, the CN sends the data to the SAN for transmission to the UT. With regard to the SAN, however, for the RRC_Connected state, the SAN operates based on the two sub-states of the RRC_Connected state—RRC_Active and RRC_PCH. Accordingly, if the UT is in the RRC_Active sub-state and the SAN receives data from the CN for the UT, the SAN forwards the data on to the UT. If the UT is in the RRC_PCH state and the SAN receives data from the CN for the UT, then the SAN must initiate the paging of the UT to return the UT to the RRC_Active sub-state, and then the SAN can forward the data on to the UT.

It is noted that the satellites are constantly moving and therefore satellite handovers occur on the service link (also commonly referred to as user link) when the UT elevation angle to a satellite is lower than a given threshold. In addition, gateway handover occurs on the feeder link to a satellite when the satellite. If the UT has not moved, however, there is no need for the UT to report its position every time it switches a beam or satellite or gateway. The GW keeps track of the satellites/beams that cover the last reported UT position. The UT location is also used to determine the Tracking Area that the UT is in, so that the GW can report the Tracking Area Identifier (TAI) to the Core Network or MME for decisions regarding authentication, authorization and legal interception routing, and for routing paging messages. This is unlike a terrestrial system where the Tracking Area is determined by the location of the cell within which the UT is located and the associated eNodeB, and the respective Tracking Area may cover an area of multiple cells and associated eNodeB's. The Tracking Area of a satellite system of example embodiments of the present invention, on the other hand, is a geographic area on the ground that may be covered by several satellite beams at any given point in time. When sending paging messages to the UT (e.g., paging messages from the CN), the SAN pages the UT via a respective satellite and beam based on the latest actual position information that was reported to the GW by the UT, and thus the GW can determine an appropriate satellite beam within the Tracking Area that can provide sufficient signal quality to the UT position. Accordingly, the RRC functions and procedures shown below includes position verification and position reporting procedures. Subsequent to successful registration with the network, the UT periodically reports its position using a position reporting procedure to determine if handover is needed while active or if a Tracking Area Update procedure is needed while in the RRC_Idle state.

According to one embodiment of such position reporting, while in the RRC_Idle state, the UT periodically reports its position to the GW and MME. By way of example, the period of this reporting may be of a relatively long time period—such as on the order of one to several hours. This periodic position reporting serves various purposes, including the provision of position updates to the GW to enable to GW to confirm that its database contains accurate and up to date position and TAI information for the UT. Another such purpose is to provide the CN/MME with what are effectively keep-alive messages to let the MME know that the UT is alive and still reachable/pageable. According to a further embodiment of such position reporting, movement of the UT by more than some predetermined threshold distance. This position update reporting, for example, serves to provide the GW with updated position information to enable the GW to be able to page the UT via an appropriate satellite beam.

RRC Functions and Procedures

| Function | Procedure | Messages | Direction | Bearer |
|---|---|---|---|---|
| System information broadcast | System information broadcast | BCCH segments | DL | SRB0 |
| NAS information transfer | DL information transfer | DL information transfer | DL | SRB2 |
| | DL information transfer Piggyback NAS messages on certain RRC messages | DL information transfer | UL | SRB2 |
| RRC connection management, Bearer management (Further details depicted in signal flow charts of FIGS. 6A and 6B) | Paging | Paging | DL | SRB0 |
| | RRC connection establishment | RRC connection establishment request | UL | SRB0 |
| | | Immediate assign. | DL | SRB0 |
| | | Immediate assign. reject | DL | SRB0 |
| | | RRC connection setup | DL | SRB1 |
| | | RRC connection setup complete | UL | SRB1 |
| | RRC connection release | RRC connection release | DL | SRB1 |
| | MAC activation | MAC activation request | UL | SRB0 |
| | | MAC activation confirm | DL | SRB1 |
| | RRC security mode | Security mode command | DL | SRB1 |
| | | Security mode complete | UL | SRB1 |
| | | Security mode failure | UL | SRB1 |
| | RRC connection reconfiguration | RRC connection reconfiguration | DL | SRB1 |
| | | RRC connection reconfiguration complete | UL | SRB1 |

-continued

| Function | Procedure | Messages | Direction | Bearer |
|---|---|---|---|---|
| Position verification and reporting | Position verification | Position verification request | UL | SRB0 |
| | | Position verification notify | DL | SRB0 |
| | RRC position report | RRC position report | UL | SRB1 |
| | | RRC position report confirm | DL | SRB1 |

Paging Scenarios

Paging applies in RRC_IDLE and RRC_PCH states. UT reports its position to SAN if it moves more than [50 km]. SAN determines satellites and beams to be used to page at UT's last known position. The following table summarizes he states in which Paging is executed.

| UT NAS States | UT RRC State | Paging Mechanism | Comment |
|---|---|---|---|
| EMM Deregistered ECM Idle | RRC Idle | None | No data bearers, hence no paging needed |
| EMM Deregistered ECM Idle | RRC Connected | None | Transient state while attaching |
| EMM Registered ECM Idle | RRC Idle | EPC triggers paging by MME-assigned id (S-TMSI). SAN pages based on UT's last reported coordinates. | SAN stores UT's last reported coordinates against its S-TMSI when in RRC Idle state to facilitate accurate paging. |
| EMM Registered ECM Idle | RRC Connected | None | Transient state while connecting |
| EMM Registered ECM Connected | RRC Connected: RRC_PCH | SAN triggers paging by SAN-assigned id (S-RNTI). SAN pages based on UT's last reported coordinates. | SAN stores UT's last reported coordinates in UT context when in RRC_PCH state. |
| EMM Registered ECM Connected | RRC Connected: RRC_ACTIVE | None | Active radio resources, hence no paging needed |

Core Network Originated Paging—RRC_IDLE to RRC_Active

When the UT is in the RRC_IDLE state and the Core Network (CN) has data to send to the UT, the CN pages the UT to request RRC connection establishment. FIG. 6D depicts a signal flow diagram illustrating RRC CN originated paging, according to example embodiments. In step 1, the MME (within the CN) sends S1 Paging to all the SAN-C's responsible for the respective Tracking Area. The message includes the UT temporary ID (S-TMSI) and a Tracking Area list (TAL), which may include a number of tracking areas within which the UT is located. Only one of the paged SAN-C's will be selected to do the paging. In step 2, the SAN-C looks up the last known location of that S-TMSI in the database, and determines the satellites/beams which cover that location, based on the constellation movement and the current satellite servicing the respective UT position (e.g., via an Ephemeris Data Processing Function or EDF). The SAN-C then sends paging requests to the SAN-R for each target satellite/beam with the S-TMSI and a default discontinuous receive (DRX) interval for the UT. In steps 3 and 4, the SAN-R schedules paging messages on the PCH for the target UT depending on the current DRX interval and sends them to the UT via the respective satellite (or in the case that multiple satellites are servicing the location, each satellite is utilized for the paging since the SAN does not know which satellite the UT is currently listening to or monitoring). In step 5, the UT is monitoring its paging opportunities based on the default DRX interval, and receives the S-TMSI based page and responds with an RRC Connection Establishment Request with cause "Paging Response." In step 6, the RRC Connection Establishment completes and the UT initial context is set up. When the E-RAB for the required CN bearer context is established, the CN (Serving Gateway) sends the queued downlink data that triggered the paging.

UT Originated MAC Activation—RRC_PCH to RRC_Active

When the UT has data to send, it requests MAC activation and transitions to RRC_ACTIVE state. FIG. 6E depicts a signal flow diagram illustrating an RRC user terminal originated MAC activation, according to example embodiments. While in RRC_PCH, when the UT needs to transmit uplink traffic, the UT triggers the MAC Activation Request procedure. In step 2, the UT transmits a MAC Activation Request on the RACH with cause "UL data." The UT already knows its GW Label (SAN-RC) and includes it in the message. The satellite receives the RACH, adds the source info (satellite, beam, carrier, frame, slot) and, in step 3, forwards the message and source information to the SAN-RC. The SAN-RC processes the RACH, which includes looking up the TAI and beam/satellite trajectory for the current UT position. Further, the S-RNTI in the message contains the logical SAN-C ID. The SAN-RC forwards the request with all this data to this SAN-C. In step 4, the SAN-C sends the Immediate Assignment on the AGCH to the UT, via the satellite. The Immediate Assignment contains the timing correction, forward timeslot assignment and MAC ID, GW Label for the RACH and traffic (SAN-R). In step 5, the SAN-C Sends the MAC Activation Confirm message on SRB2 (via the SAN-U, SAN-R, and satellite) to the UT. This message includes the MAC layer parameters for the UT, and other parameters needed in connected state (e.g., including information about upcoming beam and satellite handovers). The UT then starts monitoring the downlink channel for its assigned slot, and when the UT receives an uplink allocation, it sends the uplink data (RRC_Active State). Accordingly, the RRC_PCH state facilitates a much more efficient transition back to the RRC_Active state (e.g., from the standpoint of resources, timing, overhead, etc.), as opposed to the transition from the RRC_Idle state to the RRC_Active state.

SAN Originated Paging—RRC_PCH to RRC_Active

When the SAN has data to send, it pages the UT to request MAC activation. FIG. 6F depicts a signal flow diagram illustrating an RRC SAN originated paging, according to example embodiments. While in RRC_PCH, the GW receives DL data from the EPC (SGW). The SAN-U queues the data and requests the SAN-C to trigger paging. SAN-C determines the satellites/beams to be paged based on the last known UT position (by querying EDF). It sends paging requests to the SAN-R with the S-RNTI and current DRX interval for the UT. SAN-R schedules paging messages on the PCH slots for the target UT depending on the current DRX interval and sends them to the UT via the RFT and satellite. The UT is monitoring its paging opportunities based on its current DRX interval. It receives the S-RNTI based page and responds with a MAC Activation Request with cause "Paging Response". The UT already knows its GW Label (SAN-R), so it adds it to the message. Satellite receives the RACH, adds the source info (satellite, beam, carrier, frame, slot) and forwards to the SAN-R (via ISL and the RFT). SAN-R processes the RACH, which includes looking up the TAI and beam/satellite trajectory for the current UT position. The S-RNTI in the message contains the logical SAN-C id. SAN-R forwards the request with all this data to this SAN-C. SAN-C sends the Immediate Assignment on AGCH to SAN-RC. SAN-RC forwards it to the UT via the satellite. The Immediate Assignment contains the timing correction, forward timeslot assignment and MAC id, GW Labels for RACH (SAN-RC) and traffic (SAN-RU). SAN-C Sends the MAC Activation Confirm message on SRB2 via SAN-U, SAN-R, RFT and satellite to the UT. This contains the MAC layer parameters for the UT, and other parameters needed in connected state. This includes information about upcoming beam & satellite handovers. UT starts monitoring the downlink channel for its assigned slot. The SAN-U sends the queued downlink data that triggered paging.

Figure 7:
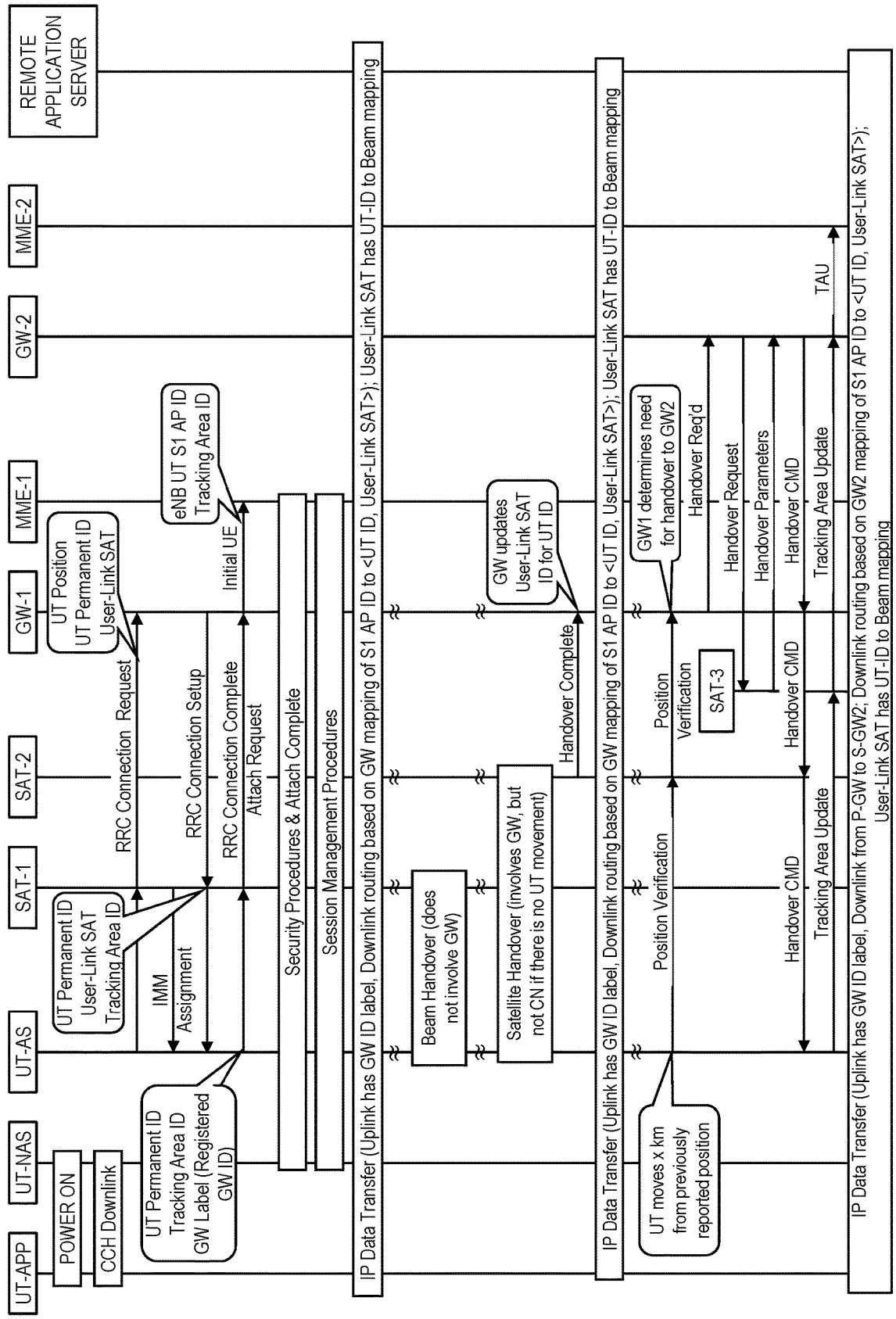
FIG. 7 depicts a signal flow diagram illustrating call flow messaging for initial registration and subsequent data transfer call phases, according to example embodiments.

FIG. 7 depicts a signal flow diagram illustrating call flow messaging for initial registration and subsequent data transfer call phases, according to example embodiments. As seen here, the user terminal initially reports is position and the GW provides an associated Tracking Area Identifier to UT based on the position of UT. The TAI identifies the Tracking Area within which the UT is located. Subsequent to security processes and session management processes that are executed as part of the Attach Procedure, IP data transfer occurs between UT and registered GW and associated core network. As shown in FIG. 7, UT the assists the satellite (when it is a processing satellite) by providing a GW Label so that the satellite can directly forward the UT packets to the intended GW without requiring a look up for every packet. Further, the GW maintains a mapping between the UT ID and the user-link satellite when the satellite is a processing satellite with Inter-Satellite Links (ISL). Otherwise, the user-link satellite is the same as the gateway link satellite. As also shown in FIG. 7, when a satellite handover is executed, the GW updates the user-link satellite ID for that user terminal. In addition, FIG. 7 shows that the UT reports its position to the GW after moving a threshold distance for the GW to determine if a handover is required. Further, the GW conveys the TAI to the user terminal, which triggers a Tracking Area Update if the TAI does not belong to the Tracking Area List provided by the core network during the previous Attach procedure. Subsequent to completion of gateway handover and Tracking Area Update procedures, the UT starts providing the new GW Label to satellite.

More specifically, as an example of radio resource connection and attach procedures for a UT, FIG. 7 depicts such procedures after initial power-on of the UT. As shown in FIG. 7, the "UT-APP" reflects the signaling and data transfers of the application running on the UT, the "UT-NAS" reflects the UT non-access stratum function and signaling between the UT and the Core Network (e.g., the MME-1), and the "UT-AS" reflects the UT access stratum function and signaling between the UT and the Gateway (e.g., the GW-1). Initially, after performing procedures regarding the control channel (CCH) downlink, the UT begins certain RRC Connection and Attach procedures. For the RRC Connection establishment procedure, the UT first sends an RRC Connection Request to the servicing Gateway (the GW-1), via a selected satellite servicing the UT location (the SAT-1). The RRC Connection Request message includes UT position information (e.g., GPS coordinates), the UT permanent ID, and user-link satellite information (User-Link SAT). Based on the provided UT position information, the GW-1 determines the appropriate Tracking Area Identifier (TAI), which identifies the Tracking Area within which the UT is located, and transmits an RRC Connection Setup message back to the UT (which includes the UT Permanent ID, the User-Link SAT and the TAI). The TAI is provided to the UT for certain respective NAS functions—by way of example, the UT can be configured with a standard NAS stack for a terrestrial system, and the UT will thereby have the necessary information for the function of the NAS stack and the NAS processes/signaling with the CN/MME.

The UT then responds to the GW-1 with an RRC Connection Complete message, along with an Attach Request, which include the UT Permanent ID, the TAI and a Registered GW ID or GW Label (which identifies the "Registered" GW-1 that is servicing the UT for the connection and where the respective UT context information is stored). The GW-1 then sends the Initial UE message to the respective mobility management entity associated with the GW-1 (the MME-1), which includes the TAI and the eNodeB UT S1 AP ID (the eNodeB UT S1 AP ID is assigned for the UT by the gateway to associate the UT with the respective control messages for the UT transmitted by the gateway to the MME over the MME-S1 interface). Certain Security, Attach and Session Management procedures are then performed between the UE and the CN/MME to complete the RRC Connection establishment and Attach procedures. As part of the Attach procedure, for example, the MME sends a TAI list to the UT, which provides a list of Tracking Areas (identified by their respective TAI's) regarding which the UT may travel amongst without providing a Tracking Area update to the MME, and which the UT thus uses to determine when a TAI Update to the MME is required. Once the Security, Attach and Session Management procedures are completed, IP data can then be transferred between the UT (e.g., the particular Application running on the UT that initiated the connection setup) and, for example, a respective remote application server. The uplink IP Data includes the GW Label (for routing by the satellite to the appropriate GW (the GW-1), and the downlink IP Data is routed based on GW mapping of the S1 AP ID to the UT ID and User-Link SAT (the satellite currently servicing the UT user-link).

With regard to the RRC Connection establishment procedure described above, various example embodiments may be implemented for assignment/identification of the particular Gateway for servicing the UT during the RRC Connection and the subsequent IP data transfers. In one such embodiment, the UT may be configured with an assigned Gateway and associated GW Label. In this case, the UT would inform the Satellite of the GW identification by including the GW Label (e.g., for the GW-1) in the RRC Connection Request message. In an alternative embodiment (when the UT is not configured with a Gateway assignment), the selected satellite (e.g., the SAT-1) will determine the servicing gateway, and the Satellite would provide the GW Label to the UT with the Immediate Assignment message. In any event, the UT provides the GW Label or to the MME along with the RRC Connection and Attach Request, as described above. Further, for various different reasons (e.g., a satellite handover that requires a gateway change, selection of a gateway that is unable or not authorized to service the UT or carry the UT data traffic, etc.), a gateway handover may be performed, as further described below.

As is further reflected in FIG. 7, handovers (e.g., between beams of the same satellite or between two different satellites, for example, due to satellite movement and UT movement) may trigger certain procedures between the UT and other entities affected by the handover or UT movement, such as User-Link SAT information updates and Tracking Area updates. By way of example, in the event of a beam handover (e.g., a handover from one beam to another beam on the same satellite SAT-1), the handover is managed between the satellite and the UT and the Gateway is not involved (the TAI and User-Link SAT remain the same). By way of further example, in the event of a satellite handover (e.g., a handover from the current satellite SAT-1 to a new satellite SAT-2), the Gateway will update the User-Link SAT for the UT ID to identify that a new satellite (SAT-2) is now servicing the User-Link of the UT. If, however, the UT moves more than a predetermined threshold distance from its previously reported location, the UT may have moved to a new Tracking Area, which would require an update of the Tracking Area and the respective TAI. The threshold distance, may be a relatively short distance (e.g., 20-50 km), for example, relative to the satellite beam size—if the UT moves a short distance relative to the satellite beam size, then the UT likely would still be at a position (based on the prior position reported to the GW) that receives sufficient signal quality within the respective satellite beam. Alternatively, when the UT has moved more than the threshold distance from the previous UT position reported to the GW-1, the UT will be triggered to provide a Position Verification message to the GW-1, including the new position of the UT.

Every time that the Gateway receives position information from the UT, the Gateway determines the associated TAI and provides the TAI to the UT. When the TAI is received by the UT, the UT determines whether the received TAI is different than the previous TAI associated with the previously reported UT position. In the event that the TAI is different, the UT will perform a Tracking Area Update for the CN by sending a Tracking Area Update message providing the new TAI to the MME (in FIG. 7, the TAI Update is shown in conjunction with a gateway handover). Further, based on the new UT position information, the Gateway GW-1 will also determine whether a handover to a different gateway is required. By way of example, a gateway handover may be required when the UT moves to a geographical area that is serviced by a different gateway (e.g., based on the geographic location of the UT relative to the current gateway and the new gateway, or based on restrictions that may be in effect for the new location of the UT). In the event that the Gateway determines that a gateway handover is required (e.g., as depicted in FIG. 7, the GW-1 may determine that a handover to the Gateway GW-2 is required, and (as also depicted in FIG. 7, as an example) at that point in time the satellite SAT-3 is servicing the UT. The GW-1 will then send a Handover Required message to the Gateway GW-2 (including the UT ID and UT position information), and the Gateway GW-2 will send a Handover Request message to the Satellite SAT-3. In response, the SAT-3 will provide respective Handover Parameters (e.g., the particular channel frequency that the GW-2 should use for communicating with the SAT-3, and other parameters related to such communications) to the Gateway GW-2. The GW-2 will then send a Handover Command message to the UT, including the TAI (associated with the new position information provided to the GW-1, which triggered the GW Handover) and the Label or ID for the Gateway GW-2. When the UT receives the TAI contained in the Handover Command, the UT determines whether the TAI is different than the previous TAI associated with the previously reported UT position. In the event that the TAI is different, the UT will perform the Tracking Area Update for the CN by sending a Tracking Area Update message providing the new TAI to the MME (now the MME-2 associated with the GW-2).

Gateway Selection and Mobility Management

According to further example embodiments, when the deployed satellites include crosslinks or inter-satellite links (ISL's), the gateway placements may be such that every given satellite orbit has to be seen by at least two geographically diverse gateways. For normal operation, while one gateway may suffice, two gateways may be required, for example, to provide for gateway backup for certain situations, such as cover for a failure one of the orbit gateways or cover for potential gateway unavailability due to the location of one of the orbit gateways in a deep rain fade zone. According to further example embodiments, gateway assignment or selection may typically be based on UT location. In some situations, however, regulatory, business or other requirements may require that traffic of a particular user be routed via a certain gateway location (e.g., a particular gateway located within a specific country)—for example, a particular country may have legal intercept regulations requiring that all data communications of particular users (e.g., data traffic of all UT's located in that country, or data traffic of certain users while located in that country) be routed through a gateway within that country for legal intercept purposes. In such situations, a terrestrial system does not encounter any problems in satisfying such regulatory or other requirements, because for all UT's located within the subject country the respective eNodeB's servicing those UT's will be located in the subject country. With satellite (e.g., LEO/MEO) systems of example embodiments, however, such regulatory or other requirements could pose potential problems, because the Gateway that may otherwise be selected for a given UT (e.g., based on location of the UT) may not be in the same country as the country in which the UT is located (e.g., a single satellite beam may cover geographical areas of multiple countries at one time). In that regard, the following describes one example embodiment of an operational procedure for gateway selection when the gateway of interest or a required gateway is not the gateway that would be selected based on the UT location:

At power ON, if no prior constellation ephemeris information is stored in UT, then UT scans for best possible signal quality (e.g., within a+/−57 degree elevation), UT selects the best satellite in view (e.g., SAT-1), UT sends RRC Connection Request on access channel (including UT GPS location) to SAT-1, and also sends measurement report of the satellites in view, SAT-1 selects destination gateway (e.g., GW-1) based on predetermined policy (e.g., location, regulatory, traffic engineering, etc.), If GW-1 is not available to SAT-1 (e.g., SAT-1 may not be able to see GW-1 at that point in time, or SAT-1 may be in an orbit not serviced by GW-1 and no cross-orbit ISL exists for routing the request to a satellite in an orbit that can reach GW-1), then SAT-1 sends UT RRC Connection Request to closest Gateway (e.g., GW-2), GW-2 determines if there exists a satellite in the constellation via which the UT can reach the intended gateway GW-1, and which also meets the signal quality criterion of the UT, If so (e.g., SAT-2), then GW-2 sends a redirect message back to UT (via SAT-2) directing UT to reattempt the RRC Connection with GW-1 via SAT-2 (providing necessary parameters)—which implies that a given gateway has information regarding the geographical coverage area of neighboring gateways, UT retransmits RRC Connection Request to GW-1 via SAT-2 and registers with GW-1, If not, then GW-2 creates a communications link (e.g., via a terrestrial VPN tunnel) to GW-1 and forwards the UT RRC Connection Request to GW-1 via the tunnel (GW-1 becomes the "Registered Gateway"), RRC layer in GW-1 responds to UT via GW-1 (e.g., via the tunnel), providing the GW Label or ID for GW-1 and informing UT of GW-2 as "Via Gateway", Subsequent transmissions from UT contain GW-1 ID (as Registered Gateway) and GW-2 ID (as Via Gateway), If SAT-2 can reach GW-1 directly, then SAT-2 forwards such UT transmissions to GW-1 as the Registered Gateway.

Traffic Shaping in the Gateway to manage Satellite Buffers

In a LEO/MEO system, even if the UT does not move, the satellite beams move over the UT location. Therefore the beam gains of the satellite vary as a function of time for a given UT location. The UT position is known by the GW. This gain could vary as much as 6 to 10 dB. Depending on the gain at a user location, adaptive coding and modulation (ACM) gets invoked in the forward link to that user in Ku-band user link. This implies that the forward link throughout for a given user varies as the satellite moves. When the throughput is low, the satellite would therefore need to buffer. To minimize buffering requirements at the satellite, the GW "shapes" the traffic to a given user based on user location. The GW reduces the rate at which transmits data to a given UT if the GW determines that the user-link satellite antenna gain is low and vice-versa. This is possible since the GW knows the UT location and the GW also knows the forward link beam gain of the user-link satellite. This will therefore minimize buffering requirement at the user-link satellite.

Flow Control Between Satellite and Gateway

Traffic shaping helps minimize buffering requirement based on UT location and user-link satellite forward link gain. However there will be cases where the user link throughput has to be throttled depending on non-deterministic factors such as rain. In this case, the buffers would start to grow in the satellite. To better manage the depth of queues in the satellite, the user-link satellite implements a simple flow-control mechanism with the Gateway. Here the user-link satellite will transmit the soft equivalent of RNR to Gateway. This can be done on satellite basis, beam-by-beam basis or user-by-user basis. When soft-RNR is received by the Gateway, the Gateway throttles the rate at which it injects data towards user-link satellite UT-UT Direct Sessions There may be some sessions that require direct communication between user terminals without passing through the gateway. In such a case, the Reassembly function of the RLC layer is selectively implemented in satellite for those sessions that require direct terminal to terminal communication without involvement of the Gateway. In this case, security contexts and keys have to be exchanged directly between two user terminals.

Gateway Architecture

Figure 8A:
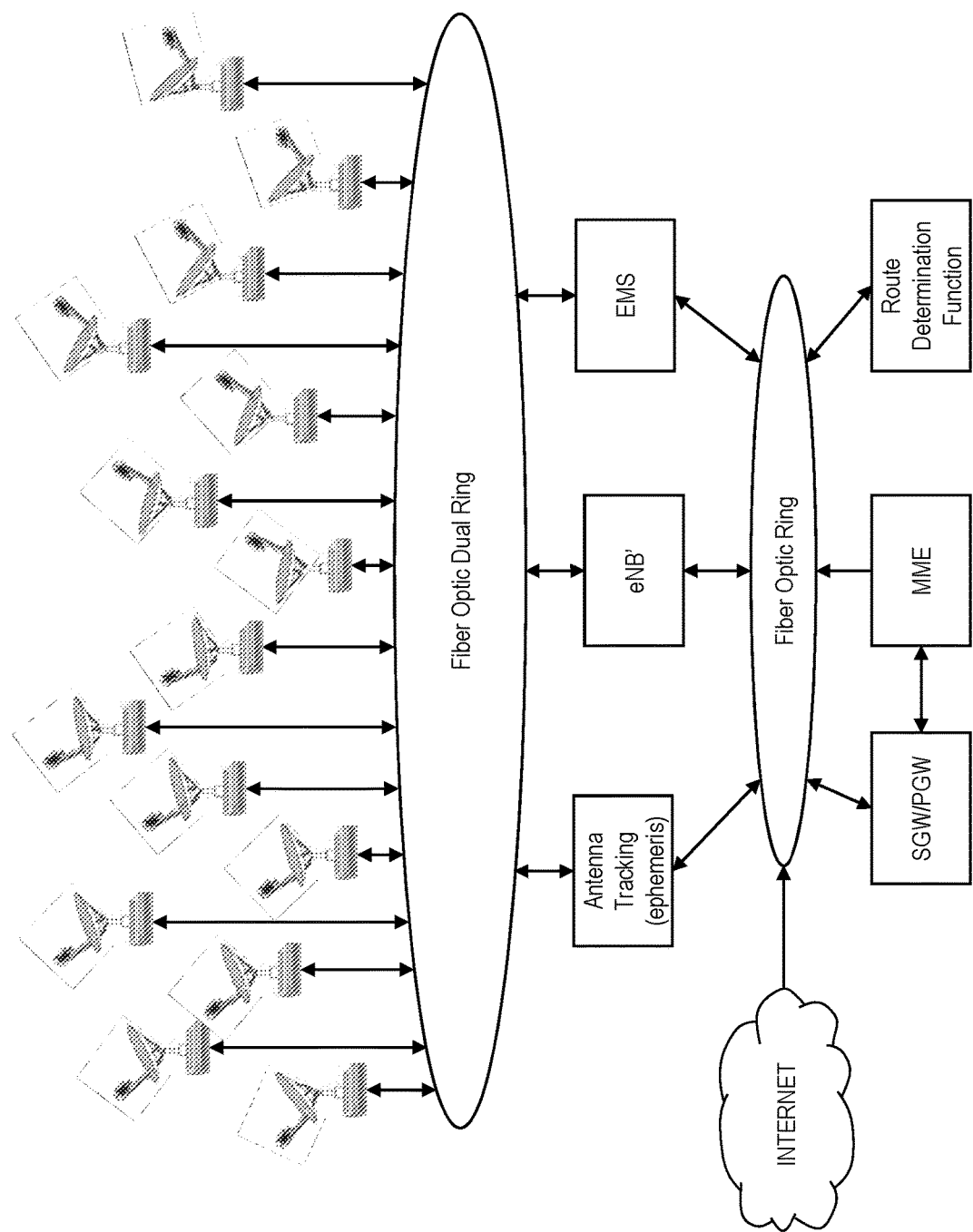
FIG. 8A illustrates an example gateway architecture, according to example embodiments.

Gateway architecture is based on 4G LTE radio network and core network architecture, modified for satellite environment. Here a Gateway has visibility to a number of LEO/MEO satellites depending on the location of gateway. Each Gateway has a number of tracking antennas in the V/Q band. FIG. 8A illustrates an example gateway architecture, according to example embodiments.

Tracking antennas have the necessary radio modulation and demodulation functions so that the baseband from multiple tracking antennas may be transported to eNB's via optical fiber link. This architecture therefore permits gateway diversity to mitigate rain propagation effects. A diverse set of tracking antennas may be placed several tens of miles away and the digital baseband signal can be hauled via fiber to the common eNB. SGW, PGW and MME are standard 4G LTE core network elements. As discussed earlier, a key component of the Gateway is the Route Determination Function (RDF) that is responsible for generating the appropriate labels for IP packets to be transmitted to user terminals communicating via the LEO/MEO constellation. This provides the centralized architecture providing clear separation between control and user plane functions. Various interfaces to the eNB' function of a given Gateway is shown in Figure below.

Figure 8B:
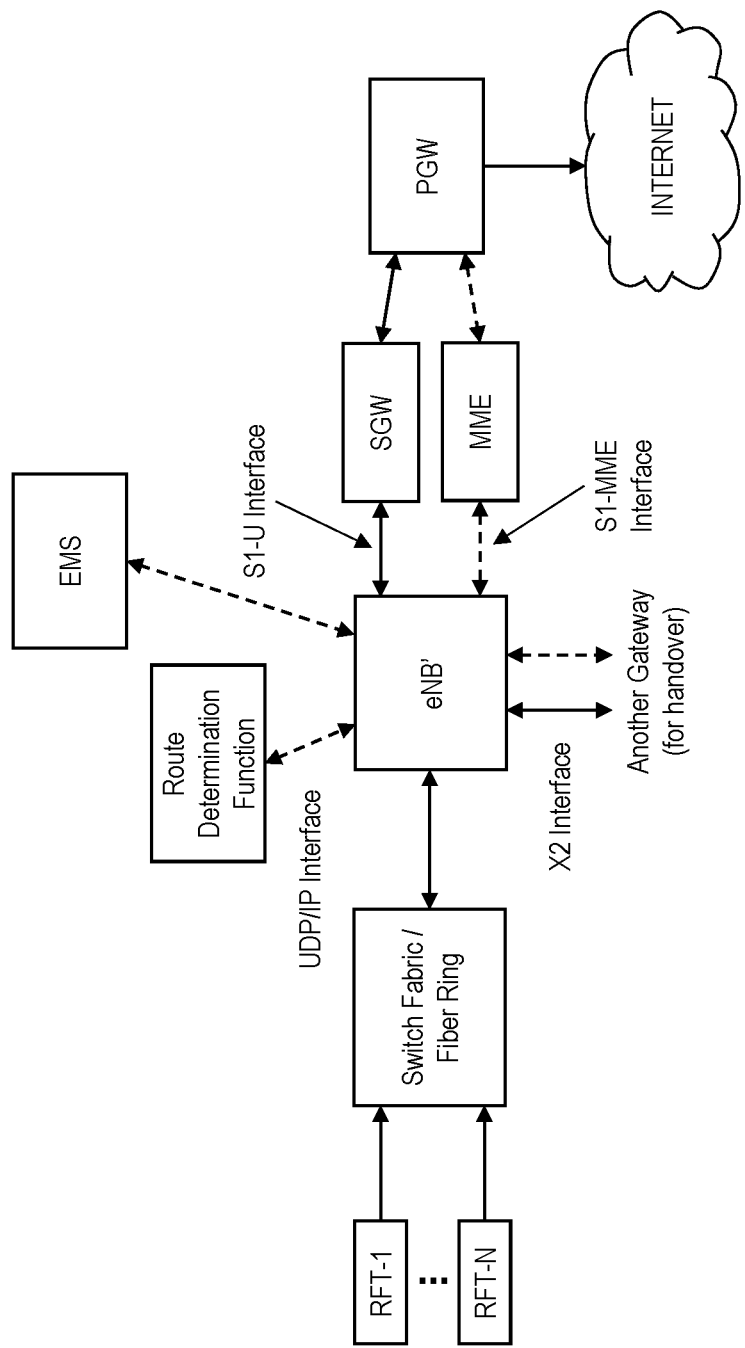
FIG. 8B illustrates interfaces to an e-node B function of a gateway, according to example embodiments.

FIG. 8B illustrates interfaces to an e-node B function of a gateway, according to example embodiments. The gateway tracking antennas may be steerable antennas or phased array antennas. For the case of phased array antennas, it is possible to have a single large array of antenna elements that form multiple beams tracking multiple satellites.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A user terminal (UT) for a mobile satellite communications system, comprising:
   at least one processor;
   wherein, when initiating a radio resource control (RRC) connection for establishing a radio connection between the UT and a respective gateway and for entering an RRC active state, the processor is configured to control the UT to transmit a connection request message to a first satellite gateway (SGW) of the mobile satellite communications system, wherein the connection request message includes position information identifying a current location of the UT and a UT identifier (UTID),
   wherein the processor is further configured to process a connection setup message received by the UT in response to the connection request message, wherein the connection setup message includes a first tracking area identifier (TAID) that identifies a one of a plurality of tracking areas that is associated with the current location of the UT, and
   wherein the processor is further configured to, after processing the connection setup message, control the UT to transmit a connection complete message to the first SGW, together with an attach request message for a core network of the mobile satellite communications system, which includes the first TAID.

2. The UT according to claim 1, wherein:
   the processor is configured to control the UT to transmit a position verification message to the first SGW when the UT moves to a new location more than a predetermined threshold distance from its previously reported location, wherein the position verification message includes updated position information identifying a new location of the UT;
   the processor is further configured to process a response message received by the UT in response to the position verification message, which includes either the first TAID when the new location of the UT is associated with the one tracking area or a second TAID that identifies another of the plurality of tracking areas that is associated with the new location of the UT; and
   the processor is further configured to determine whether the response message includes the first TAID or the second TAID, and to control the UT to transmit a tracking area update message to the first SGW for the core network when it is determined that the response includes the second TAID, wherein the tracking area update message includes the second TAID.

3. The UT according to claim 1, wherein:
   the processor is configured to control the UT to transmit a position verification message to the first SGW when the UT moves to a new location more than a predetermined threshold distance from its previously reported location, wherein the position verification message includes updated position information identifying a new location of the UT;
   the processor is further configured to process a handover command received by the UT from a second SGW of the mobile satellite communications system, wherein the handover command includes either the first TAID when the new location of the UT is associated with the one tracking area or a second TAID that identifies another of the plurality of tracking areas that is associated with the new location of the UT; and
   the processor is further configured to determine whether the handover command includes the first TAID or the second TAID, and to control the UT to transmit a tracking area update message to the second SGW for the core network when it is determined that the response message includes the second TAID, wherein the tracking area update message includes the second TAID.

4. The UT according to claim 1, wherein the connection complete message includes a gateway identifier (GWID) that identifies the first SGW as the gateway that is servicing the UT for the connection.

5. A method for managing tracking areas for a user terminal (UT) of a mobile satellite communications system, comprising:
   when initiating a radio resource control (RRC) connection for establishing a radio connection between the UT and a respective gateway and for entering an RRC active state by the UT, transmitting, by the UT, a connection request message to a first satellite gateway (SGW) of the mobile satellite communications system, wherein the connection request message includes position information identifying a current location of the UT and a UT identifier (UTID);
   processing a connection setup message received by the UT in response to the connection request message, wherein the connection setup message includes a first tracking area identifier (TAID) that identifies a one of a plurality of tracking areas that is associated with the current location of the UT; and
   transmitting, by the UT, a connection complete message to the first SGW, together with an attach request message for a core network of the mobile satellite communications system, which includes the first TAID.

6. The method according to claim 5, further comprising:
   transmitting, by the UT, a position verification message to the first SGW when the UT moves to a new location more than a predetermined threshold distance from its previously reported location, wherein the position verification message includes updated position information identifying a new location of the UT;
   processing a response message received by the UT in response to the position verification message, which includes either the first TAID when the new location of the UT is associated with the one tracking area or a second TAID that identifies another of the plurality of tracking areas that is associated with the new location of the UT;
   determining whether the response message includes the first TAID or the second TAID; and
   transmitting, by the UT, a tracking area update message to the first SGW for the core network when it is determined that the response message includes the second TAID, wherein the tracking area update message includes the second TAID.

7. The method according to claim 5, further comprising:
transmitting, by the UT, a position verification message to the first SGW when the UT moves to a new location more than a predetermined threshold distance from its previously reported location, wherein the position verification message includes updated position information identifying a new location of the UT;
processing a handover command received by the UT from a second SGW of the mobile satellite communications system, wherein the handover command includes either the first TAID when the new location of the UT is associated with the one tracking area or a second TAID that identifies another of the plurality of tracking areas that is associated with the new location of the UT;
determining whether the handover command includes the first TAID or the second TAID; and
transmitting, by the UT, a tracking area update message to the second SGW for the core network when it is determined that the response message includes the second TAID, wherein the tracking area update message includes the second TAID.

8. The method according to claim 5, wherein the connection complete message includes a gateway identifier (GWID) that identifies the first SGW as the gateway that is servicing the UT for the connection.

9. A mobile satellite communications system comprising:
one or more non-geosynchronous orbit satellites;
a user terminal (UT);
a first satellite gateway (SGW); and
a core network; and
wherein, when initiating establishment of a radio resource control (RRC) connection for establishing a radio connection between the UT and the first satellite gateway and for entering an RRC active state, the UT is configured to transmit a connection request message to the first SGW, which includes position information identifying a current location of the UT and a UT identifier (UTID),
wherein the first SGW is configured to, after receiving the connection request message from the UT, determine, based on the position information, a one of a plurality of tracking areas that is associated with the current location of the UT, and to transmit a connection setup message back to the UT, which includes a first tracking area identifier (TAID) that identifies the one tracking area,
wherein the UT is configured to, after receiving the connection setup message from the first SGW, transmit a connection complete message to the first SGW, together with an attach request message for the core network, which includes the first TAID, and
wherein the first SGW is configured to, after receiving the connection complete and attach request messages from the UT, transmit an initial UT message to the core network, which includes the first TAID.

10. The mobile satellite communications system according to claim 9, wherein:
the UT is configured to transmit a position verification message to the first SGW when the UT moves to a new location more than a predetermined threshold distance from its previously reported location, wherein the position verification message includes updated position information identifying a new location of the UT;
the first SGW is configured to, after receiving the position verification message from the UT, determine, based on the updated position information, which of the plurality of tracking areas is associated with the new location of the UT, and to transmit a response message back to the UT, which includes either the first TAID when the new location of the UT is associated with the first tracking area or a second TAID that identifies another of the plurality of tracking areas that is associated with the new location of the UT;
the UT is configured to, after receiving the response message from the first SGW, determine whether the response message includes the first TAID or the second TAID, and to transmit a tracking area update message to the first SGW for the core network when it is determined that the response includes the second TAID, wherein the tracking area update message includes the second TAID; and
the first SGW is configured to, after receiving the tracking area update message from the UT, transmit the tracking area update message, including the second TAID, to the core network.

11. The mobile satellite communications system according to claim 9, wherein the connection complete message includes a gateway identifier (GWID) that identifies the first SGW as the gateway that is servicing the UT for the connection.

12. The mobile satellite communications system according to claim 9, wherein:
the UT is configured to transmit a position verification message to the first SGW when the UT moves to a new location more than a predetermined threshold distance from its previously reported location, wherein the position verification message includes updated position information identifying a new location of the UT;
the first SGW is configured to, after receiving the position verification message from the UT, determine, based on the updated position information, whether a handover to a second SGW is required;
when the first SGW determines that the handover to the second SGW is required, (i) the first SGW is configured to transmit an SGW handover message to the second SGW, including the UTID and the updated UT position information, (ii) the second SGW is configured to, after receiving the SGW handover message from the first SGW, determine, based on the updated position information, which of the plurality of tracking areas is associated with the new location of the UT, and to transmit a handover command message to the UT, which includes either the first TAID when the new location of the UT is associated with the first tracking area or a second TAID that identifies another of the plurality of tracking areas that is associated with the new location of the UT, (iii) the UT is configured to, after receiving the handover command message from the first SGW, determine whether the handover command message includes the first TAID or the second TAID, and to transmit a tracking area update message to the second SGW for the core network when it is determined that the handover command message includes the second TAID, wherein the tracking area update message includes the second TAID, and (iv) the second SGW is configured to, after receiving the tracking area update message from the UT, transmit the tracking area update message, including the second TAID, to the core network.

13. The mobile satellite communications system according to claim 12, wherein the connection complete message includes a first gateway identifier (GWID) that identifies the first SGW as the gateway that is initially servicing the UT for the connection, and the handover command message includes a second gateway identifier (GWID) that identifies the second SGW as the gateway that is servicing the UT for the connection after the handover to the second SGW.

14. The mobile satellite communications system according to claim 12, wherein:
- the position verification message is transmitted to the first SGW via at least a first of the one or more non-geosynchronous orbit satellites;
- wherein the second SGW is associated with at least a second of the of the one or more non-geosynchronous orbit satellites;
- the second SGW is configured to, after receiving the SGW handover message from the first SGW, transmit a satellite handover message to the second satellite;
- the second satellite is configured to, after receiving the satellite handover message from the first SGW, transmit a satellite handover response message back to the second SGW, which includes satellite handover parameters;
- the handover command message is transmitted by the second SGW to the UT via the first SGW and at least the first satellite; and
- the tracking area update message is transmitted by the UT to the second SGW for the core network via at least the second satellite.

15. The mobile satellite communications system according to claim 14, wherein the connection complete message includes a first gateway identifier (GWID) that identifies the first SGW as the gateway that is initially servicing the UT for the connection, and the handover command message includes a second gateway identifier (GWID) that identifies the second SGW as the gateway that is servicing the UT for the connection after the handover to the second SGW.

* * * * *